United States Patent
Dent

(10) Patent No.: US 7,155,229 B2
(45) Date of Patent: Dec. 26, 2006

(54) DISTRIBUTED WIRELESS ARCHITECTURE USING MICROCAST

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 598 days.

(21) Appl. No.: 10/041,251

(22) Filed: Jan. 8, 2002

(65) Prior Publication Data

US 2003/0129984 A1    Jul. 10, 2003

(51) Int. Cl.
*H04Q 7/20* (2006.01)
(52) U.S. Cl. .......... 455/450; 455/63.1; 455/561; 455/509; 455/443; 455/560; 370/335
(58) Field of Classification Search ..... 455/450–452.1, 455/452.2, 432.1, 424, 428, 63.1, 63.3, 67.13, 455/509, 513, 552.1, 447–448, 440, 525, 455/560–561; 370/330, 335, 337, 334, 280, 370/320, 342; 375/297, 260
See application file for complete search history.

(56) References Cited

U.S. PATENT DOCUMENTS

| | | | |
|---|---|---|---|
| 5,483,666 A * | 1/1996 | Yamada et al. .......... 455/454 |
| 5,513,210 A | 4/1996 | Demange et al. |
| 5,581,548 A | 12/1996 | Gudmundson et al. |
| 5,583,866 A | 12/1996 | Demange et al. |
| 5,825,763 A * | 10/1998 | Kato et al. .......... 370/335 |
| 5,838,732 A * | 11/1998 | Carney .......... 375/297 |
| 5,918,169 A * | 6/1999 | Dent .......... 455/324 |
| 5,966,657 A * | 10/1999 | Sporre .......... 455/425 |
| 5,978,368 A * | 11/1999 | Hjelm et al. .......... 370/347 |
| 6,009,332 A | 12/1999 | Haartsen |
| 6,075,990 A | 6/2000 | Shin |
| 6,298,081 B1 | 10/2001 | Almgren et al. |
| 6,317,598 B1 * | 11/2001 | Wiesen et al. .......... 455/443 |
| 6,466,793 B1 * | 10/2002 | Wallstedt et al. .......... 455/450 |
| 6,477,154 B1 * | 11/2002 | Cheong et al. .......... 370/328 |
| 6,519,456 B1 * | 2/2003 | Antonio et al. .......... 455/442 |
| 6,526,264 B1 * | 2/2003 | Sugar et al. .......... 455/84 |
| 6,567,482 B1 * | 5/2003 | Popovic' .......... 375/343 |

(Continued)

FOREIGN PATENT DOCUMENTS

WO    WO 01 24400    4/2001

(Continued)

OTHER PUBLICATIONS

Patent Abstracts of Japan, vol. 1995, No. 03, Apr. 28, 1995 & JP 06 343066 A (Nippon Telegraph & Telephone Corp), Dec. 13, 1994.

*Primary Examiner*—Joseph Feild
*Assistant Examiner*—Kamran Afshar
(74) *Attorney, Agent, or Firm*—Coats & Bennett, P.L.L.C.

(57) ABSTRACT

A mobile communication system comprises a plurality of cells, with each cell including a network of microstations distributed more or less uniformly throughout the cell. A central controller connected to the network of microstations selects a group of microstations in the vicinity of the mobile terminal to transmit information to the mobile terminal. The selected microstations in the active set for a given mobile terminal is continuously updated as the mobile terminal moves through the network of microstations to form a virtual cell that follows the mobile terminal through the network. Transmission conflicts between two mobile terminals is avoided by inhibiting transmissions from an active microstation to at least one of the co-channel mobile terminals when a transmission conflict is detected.

50 Claims, 16 Drawing Sheets

U.S. PATENT DOCUMENTS

| | | | |
|---|---|---|---|
| 6,580,924 B1* | 6/2003 | Lu et al. | 455/560 |
| 6,611,688 B1* | 8/2003 | Raith | 455/440 |
| 6,625,466 B1 | 9/2003 | Dicker et al. | |
| 6,684,366 B1* | 1/2004 | Trott et al. | 714/790 |
| 6,934,340 B1* | 8/2005 | Dollard | 375/260 |
| 6,954,645 B1* | 10/2005 | Tsai et al. | 455/449 |
| 2001/0024475 A1* | 9/2001 | Kumar | 375/270 |
| 2001/0031646 A1* | 10/2001 | Williams | 455/560 |
| 2002/0061764 A1* | 5/2002 | Kim et al. | 455/442 |
| 2002/0101937 A1* | 8/2002 | Antonio et al. | 375/297 |
| 2002/0122461 A1 | 9/2002 | Ghoshtagore et al. | |
| 2003/0058950 A1* | 3/2003 | McCoy | 375/260 |
| 2003/0078043 A1* | 4/2003 | Horwath et al. | 455/436 |
| 2003/0114180 A1* | 6/2003 | Black et al. | 455/522 |
| 2003/0128678 A1* | 7/2003 | Subrahmanya et al. | 370/335 |
| 2004/0043769 A1* | 3/2004 | Amerga et al. | 455/437 |
| 2004/0043798 A1* | 3/2004 | Amerga et al. | 455/574 |
| 2004/0120409 A1* | 6/2004 | Yasotharan et al. | 375/260 |

FOREIGN PATENT DOCUMENTS

WO     WO 01 63785     8/2001

\* cited by examiner

DISTRIBUTED WIRELESS ARCHITECTURE USING MICROCAST

BACKGROUND OF THE INVENTION

The present invention relates to cellular communication systems and more particularly to a new architecture for a cellular communication system to reduce co-channel interference and increase system capacity.

In cellular communication systems, frequency reuse plans allow the same frequency to be used more than once within the system. Thus in contrast with broadcasting, cellular systems divide a service region into smaller cells that transmit different signals for different users. The available frequencies are divided into frequency groups and each cell is assigned at least one frequency group to use for communications with mobile terminals within that cell.

To avoid the problem of co-channel interference, cells assigned the same frequency group, known as co-channel cells, are spatially separated so that the mobile terminal operating within a cell receives the desired signal at a higher level than any potential interfering signal from co-channel cells. Cells operating at different frequencies are placed between any two co-channel cells. In general, the power of any interfering signal diminishes with increasing distance between interfering users. A frequency group can be reused if the interference level is reduced sufficiently by separation between the co-channel calls. The interference level is measured by the carrier power to interference power ratio, C/I. The C/I ratio is the primary criteria used in designing frequency reuse plans.

From the foregoing, it should be apparent that the number of times a given frequency can be reused in a system is related to the separation distance or reuse distance between any two co-channel cells, and the radius of the cells. Current systems serve a cell of given radius using a large centrally-located tower. Unfortunately with this method of covering the service area, the spill-over of interference into neighboring cells diminishes only slowly with distance. Therefore, there is an interest in a method of coverage which gives more rapid unwanted signal attenuation outside the service area.

SUMMARY OF THE INVENTION

A communication network includes a plurality of cells, with each cell covered by a network of closely-spaced microstations rather than a single centrally-located station. Each microstation within a given cell may transmit the same information using a low power transmitter to provide a more uniform signal level across the cell. This extension of the known simulcast technique to a large number of microstations is referred to herein as microcast. Using the present invention, the signal strength is more evenly distributed over the cell, instead of being high near the center of a cell and low at the edge of a cell. Moreover, the signal strength outside the cell falls off rapidly with distance, allowing in some cases immediate frequency reuse in adjacent cells without interference. The microcast system may also be used to provide both radio and television service.

The present invention is particularly suited for a mobile communication system, such as a cellular communication system. The immediate reuse of frequencies in a cellular communication system can be facilitated by transmitting signals to each mobile terminal using only a subset of microstations in a given cell. The microstations selected to transmit information to a given mobile terminal, referred to herein as the active set for the mobile terminal, are, for example, those closest to the mobile terminal's current location. The microstations farther away from the mobile terminal either do not transmit or transmit a signal for a different mobile terminal. As the mobile terminal moves through the network, the microstations that receive signals from the mobile terminal the strongest are continuously re-identified and selected to include in the mobile terminal's active set. Thus, the cluster of microstations in the mobile terminal's active set is continuously repositioned to be centered on the mobile terminal's current location and can be regarded as a continuously-movable virtual cell.

For digital transmissions, performance may be improved by delaying the modulation transmitted from one-third of the microstations in the active set for a given mobile terminal by one symbol period and advancing the modulation by one symbol period at another third of the microstations in the active set. A signal received at the mobile terminal thus appears to have propagated through a multipath channel with two symbol periods of time dispersion, and such a signal may be advantageously decoded using a Viterbi equalizer. The transmission timing may alternatively be adapted based on relative receive delays.

Signals transmitted from the mobile terminal and received at the microstations are preferably conveyed to a central processor identified for a given mobile terminal. The central processor jointly processes the signals received from the selected microstations in order to decode the wanted signal with a high order of spatial diversity and can include interference suppression techniques.

The microcast system of the present invention may also be applied to digital TV or radio broadcasting which is more amenable to the use of an equalizer to process signals received with artificial time dispersion from multiple microstations.

DETAILED DESCRIPTION OF THE INVENTION

Figure 1:
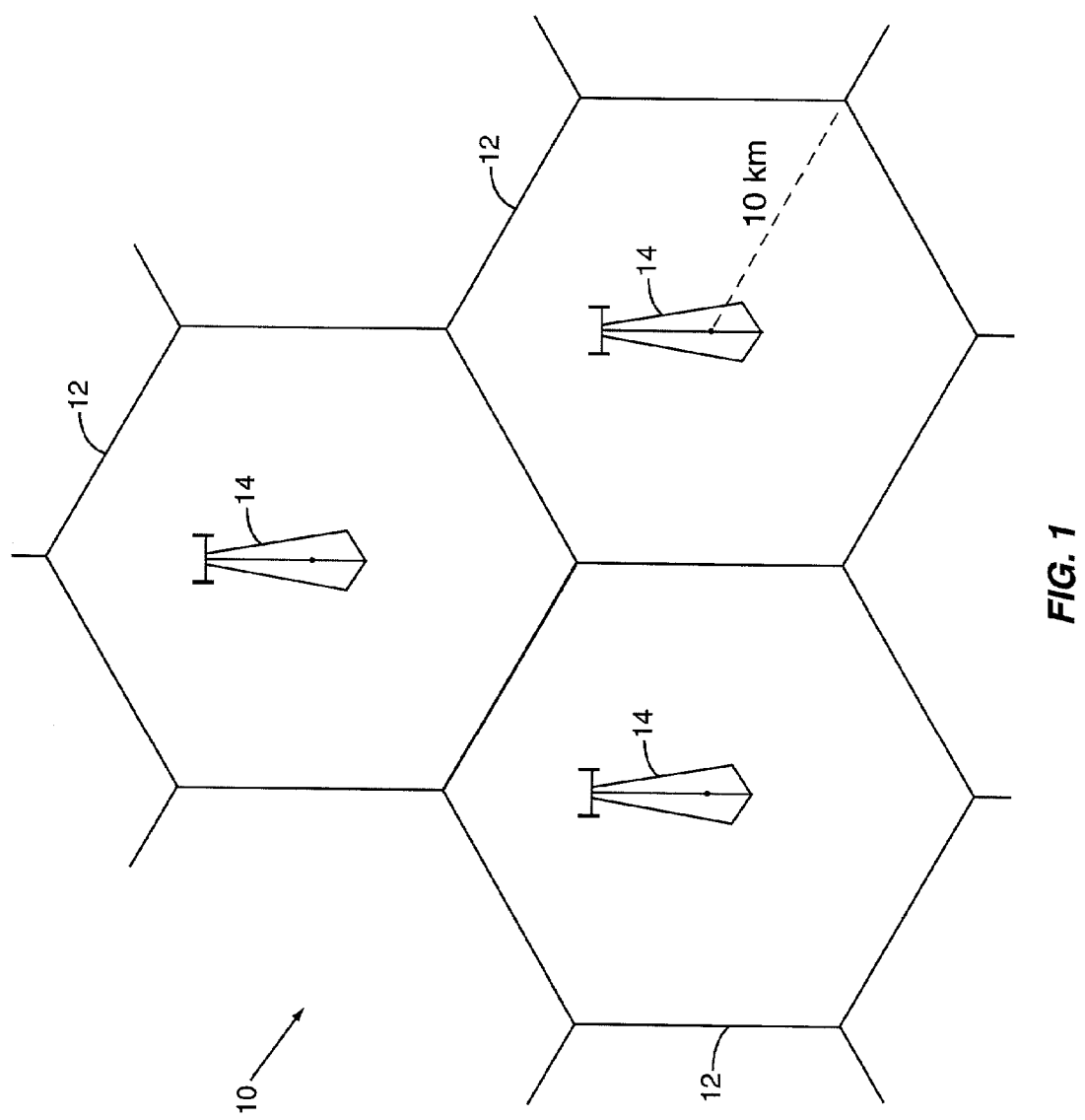
FIG. 1 is a diagram of a conventional cellular communication network having a plurality of cells with a single base station in each cell.
Figure 3:
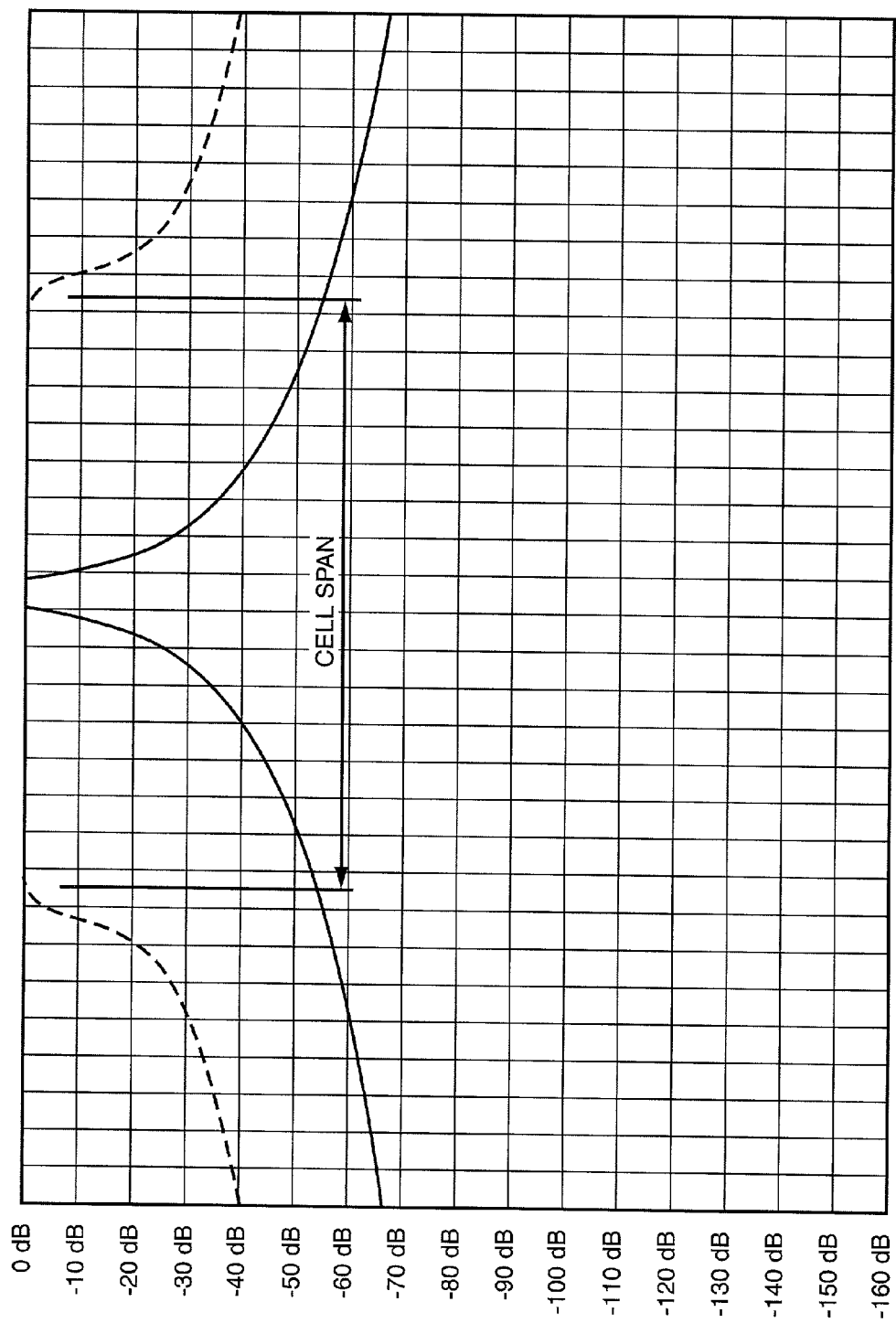
FIG. 3 is a graph of received power versus distance for a conventional cellular network shown in solid lines and the communication network according to the present invention shown in dotted lines.

Referring now to the drawings, FIG. 1 illustrates a conventional macro-cellular communication system indicated generally by the numeral 10. The cellular communication system 10 comprises a plurality of relatively large cells 12 approximately 20 km in diameter. A centrally located base station 14 serves each cell 12. Signals transmitted by the base station 14 propagate from the base station 14 to the perimeter of the cell in all directions. The power of the signal transmitted from the base station 14 at any given point steadily diminishes as a function of the distance from the base station 14. In a vacuum, the signal strength varies inversely in proportion to the square of the distance from the base station 14. In practice, path loss in a cellular communication system is more severe than the inverse square law would predict due to terrain, atmospheric conditions, and other real-world effects. In general, it is normally assumed that the signal power at any given point varies inversely in proportion to the fourth power of the distance from the base station 14. FIG. 3 plots the signal strength as a function of distance in a typical macro-cellular system. As seen in FIG. 3, the signal is strongest near the center of the cell 12 and is low near the cell boundary. The base station 14 must transmit with sufficient power to provide a minimum useful signal level at the edge of the cell 12.

Figure 2:
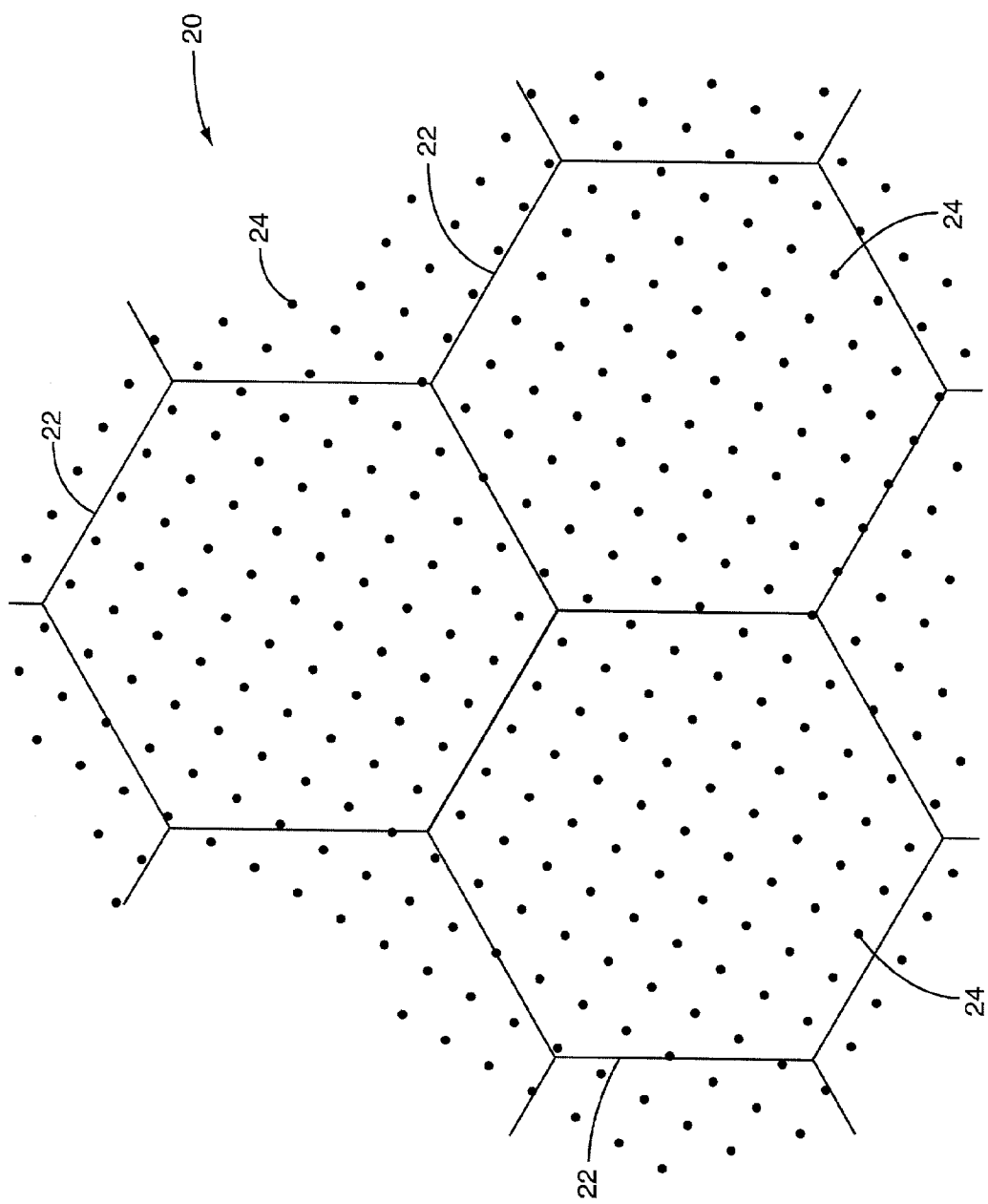
FIG. 2 is a diagram of cellular communication network according to the present invention having a plurality of cells with a network of microstations in each cell.

FIG. 2 illustrates a microcellular system according to the present invention, which is indicated generally by the numeral 20. The microcellular system 20 comprises a plurality of cells 22. Unlike a conventional macro-cellular system 10, the microcellular system 20 of the present invention employs a network of low power microstations 24 in each cell 22, which may be uniformly distributed throughout the cell 22, instead of a single centrally located base station 14. The microstations 24 may be arranged in a variety of grid patterns, such as a square grid pattern or a hexagonal grid pattern. In actual practice, the grid pattern is likely to be somewhat irregular, due to the availability of suitable sites for mounting the microstations 24. Nevertheless, for purposes of explanation of the inventive concepts, a uniform distribution pattern is assumed. If all of the microstations 24 are activated simultaneously, the signal strength at any given point may be computed by adding the contributions from each microstation 24, taking into account attenuation according to the fourth power of the distance.

In the exemplary embodiment shown in FIG. 2, the microstations 24 are arranged in a grid pattern and the spacing between microstations 24 is approximately $1/10^{th}$ of the cell radius. Thus, the number of microstations 24 in the exemplary embodiment is 100 times pi, or approximately 315 microstations 24 for a circular cell 22. A plot of the signal strength versus distance for the exemplary microcellular system 20 is also shown in FIG. 3. By using a network of low power microstations 24 instead of a single high power transmitter at the center of the cell 22, the signal strength is more evenly distributed across the cell 22 and falls off rapidly beyond the cell boundary. As shown in FIG. 3, the signal strength at the cell boundary is approximately −1 dB, compared to −55 dB for a conventional macro-cellular system 10. This comparison assumes that the microstations 24 transmit at the same power level as the centrally-located base station 14 in a conventional macro-cellular system 10. Thus, the signal strength at the cell boundary is 54 dB higher for the same power level, allowing each of the microstations 24 to be reduced in power by 54 dB for the same cell edge signal level. By reducing the power transmitted by each microstation 24, the total power transmitted by all microstations 24 would be 29 dB lower than the single base station 14 in a conventional macro-cellular system 10. As an example, a typical cellular site radiates 20 watts per channel using a +24 dBi antenna gain, giving +37 dBW effective isotropically radiated power (EIRP). The microstations 24 of the present invention can be 54 dB less EIRP, i.e., −17 dBW, which may be achieved using less than 20 mW into a dipole antenna.

Figure 5:
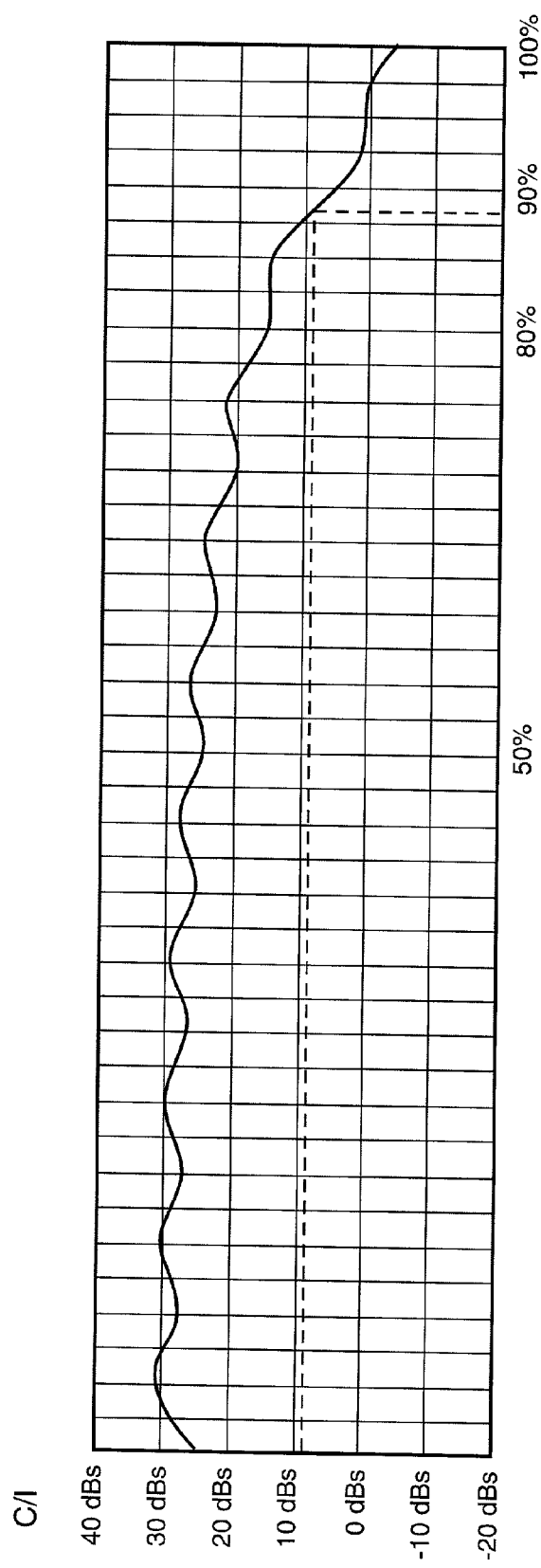
FIG. 5 is a graph of carrier-to-interference ratio versus cell radius in a cell of the communication system according to the present invention.

Assuming a large network of multiple cells 22, each covered by a plurality of microstations 24 transmitting on the same frequency, the carrier-to-interference (C/I) ratio within any cell 22 can be calculated and is shown in FIG. 5. As shown in FIG. 5, to achieve a C/I ratio of 9 dB (a figure frequently used in GSM systems) the mobile terminal can be located out to 88% of the cell radius.

According to the present invention, gain in capacity may be obtained by transmitting signals to a mobile terminal using a subset of microstations 24 in a given cell 22. The selected subset would be a group of microstations 24 in the vicinity of the mobile terminal. More particularly, a subset of microstations 24 surrounding the current location of the mobile terminal may transmit the same signal on the downlink channel assigned to the mobile terminal, while the microstations 24 farther away from the mobile terminal do not transmit on the downlink channel to the mobile terminal. The set of "active" microstations 24 for a given mobile terminal is referred to herein as the active set. The area covered by the active set may be regarded as a virtual cell for the mobile terminals. Since mobile terminal positions within cells 22 are random, clustering of the mobile terminals at the same cell location is unlikely. Even this unlikely occurrence can be avoided by sorting the mobile terminals into co-channel groups with the mobile terminals in the same co-channel group being separated by a sufficient distance to avoid undesirable levels of interference. Thus, the same channel may be used simultaneously by multiple mobile terminals in the same cell 22.

As a mobile terminal moves about within the cell 22, the active set for the mobile terminal continuously changes, forming what may be regarded as a moving virtual cell. The microstations 24 that receive the strongest signal from the mobile terminal are identified and become the new active set for the mobile terminal. The "silent" microstations 24 form a buffer zone around the "active" microstations 24 that reduces interference in the adjacent cells 22, and further allows reuse of the channel by other mobile terminals in the same cell.

Figure 4C:
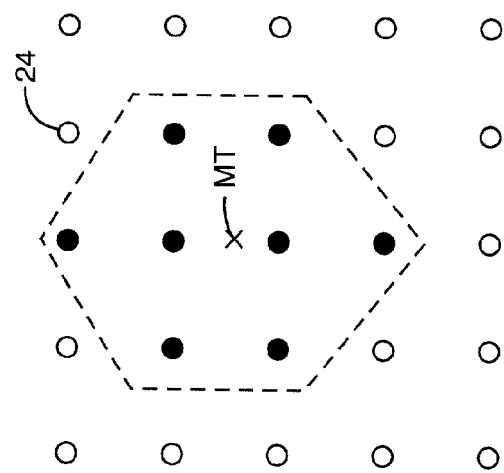
FIGS. 4a–4c are diagrams illustrating various methods of selecting a group of microstations in a network of microstations to serve a mobile terminal.
Figure 4B:
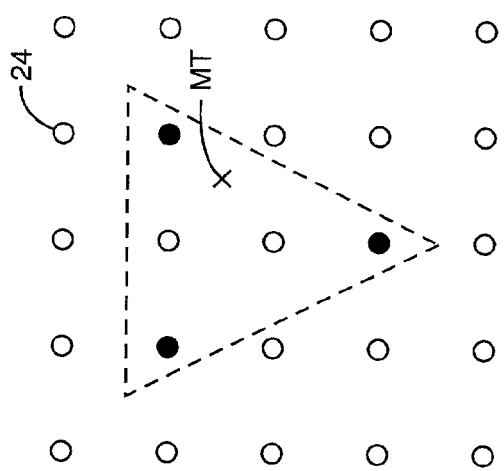
Figure 4A:
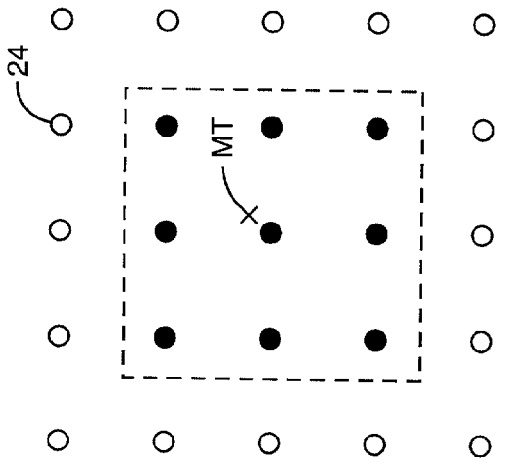

Determining the active set for a mobile terminal may be done in a variety of ways. FIGS. 4a through 4c show three methods of determining the active set based on signal strength measurements on the uplink channel assigned to the mobile terminal. In FIGS. 4a through 4c, a square grid pattern is assumed. In FIG. 4a, the active set comprises a 3 by 3 cluster of microstations 24 centered on the microstation 24 that receive the strongest signal from the mobile terminal on the uplink. In FIG. 4b, the active set comprises the three microstations that receives the strongest signal from the mobile terminal. This method assumes that the mobile terminal is located in the triangle defined by the three microstations receiving the strongest signal. In FIG. 4c, the active set comprises all microstations 24 that receive the signal from the mobile terminal above a predetermined threshold. These methods of determining the active set may be used either alone or in combination.

Other methods of determining the active set may be used that do not depend on signal strength measurements. For example, the current position of the mobile terminal may be computed and compared to the known coordinate locations of the microstations 24. In this case, the microstations 24 closest to the current location of the mobile terminal may be included in the active set. The current position of the mobile terminal may be computed by triangulation as is well-known to those skilled in the art. Alternatively, a mobile terminal equipped with a positioning receiver, such as a GPS receiver, may be required to periodically report its current location to the network or to provide position data from which its position can be determined.

The size of the active set may also be dependent on factors such as the accuracy with which the mobile terminal can be located, and the velocity or rate of travel of the mobile terminal. If the microstations 24 are close together and the mobile terminal is moving rapidly, it may not be possible to dynamically change the active set fast enough to track the mobile terminal through the network. In this case, the active set may be increased in number such that the mobile terminal is unlikely to pass through the area defined by the active set, i.e. virtual cell, between updates to the active set.

Figure 6:
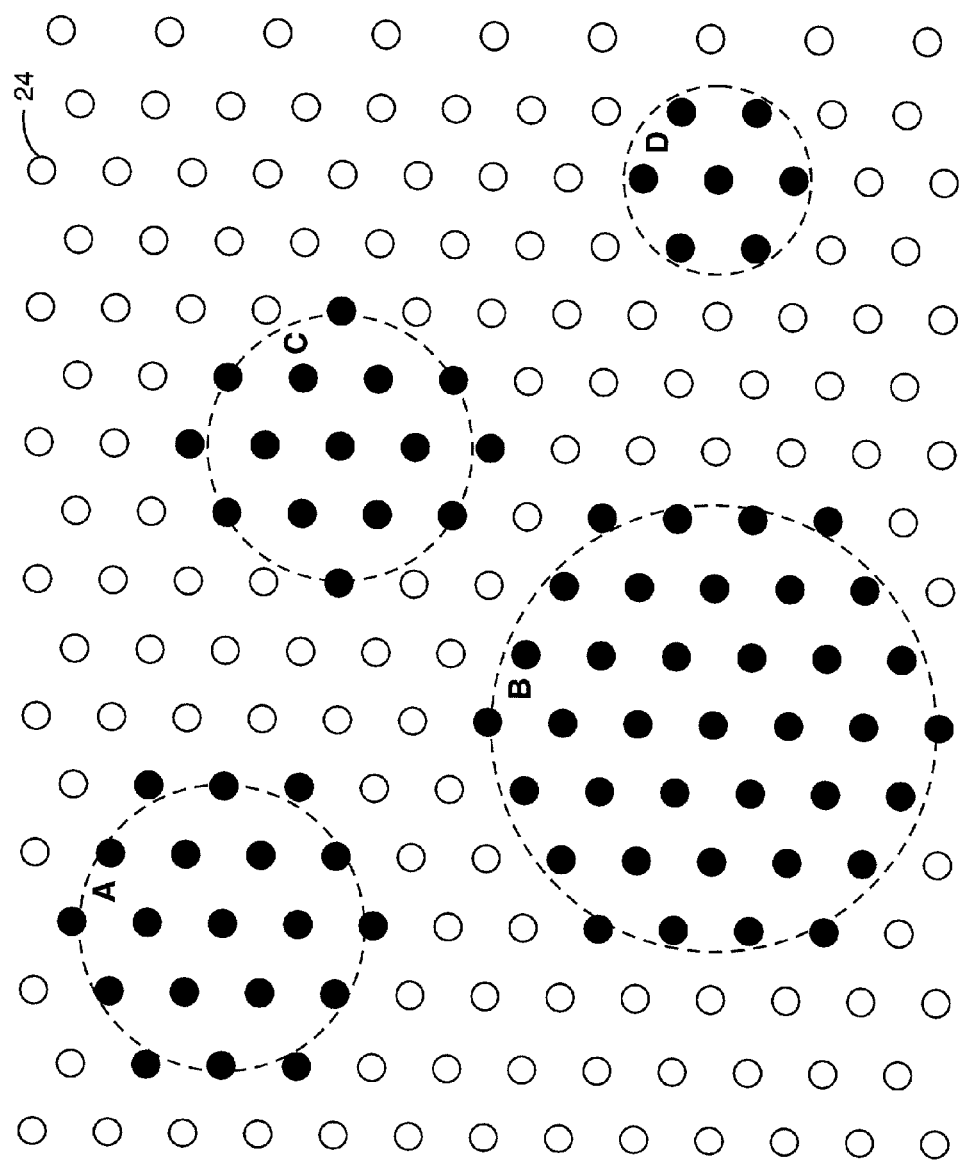
FIG. 6 is a diagram illustrating a network of microstations showing a possible activation pattern for four mobile terminals on a single communication channel.

FIG. 6 illustrates a pattern of activated microstations 24 serving four different mobile terminals all using the same channel. The active microstations 24 are shown with a solid black fill, while the inactive microstations are shown with no fill. It should be noted that the microstations 24 designated as inactive may in fact be transmitting on a different channel to other mobile terminals. The active sets, labeled A–D, form circles around the mobile terminals. The smaller circles represent the active sets for mobile terminals whose position can be accurately determined, such as static or slow-moving terminals, while the larger circles represent the active sets for mobile terminals whose position cannot be accurately determined, such as rapidly moving terminals.

The active microstations 24 in FIG. 6 are using the same channel, but due to the distance between the mobile terminals, and the fact that the mobile terminals are located near the centers of their respective active sets, the interference between co-channel users is low and an acceptable C/I ratio is obtained. Other terminals, whose active sets overlap those shown in FIG. 6, may use a different channel without degrading the C/I ratio. Thus, the pattern of the active sets will differ from one channel to another. The active sets operating on the same channel are spatially separated, while the active sets on different channels may overlap. In effect, the active sets define a plurality of micro cells, the centers of which will vary from one channel to the next. In contrast, the macro-cellular system 10 shown in FIG. 1 uses a single fixed base station 14 to transmit all channels assigned to a cell 12.

Figure 7:
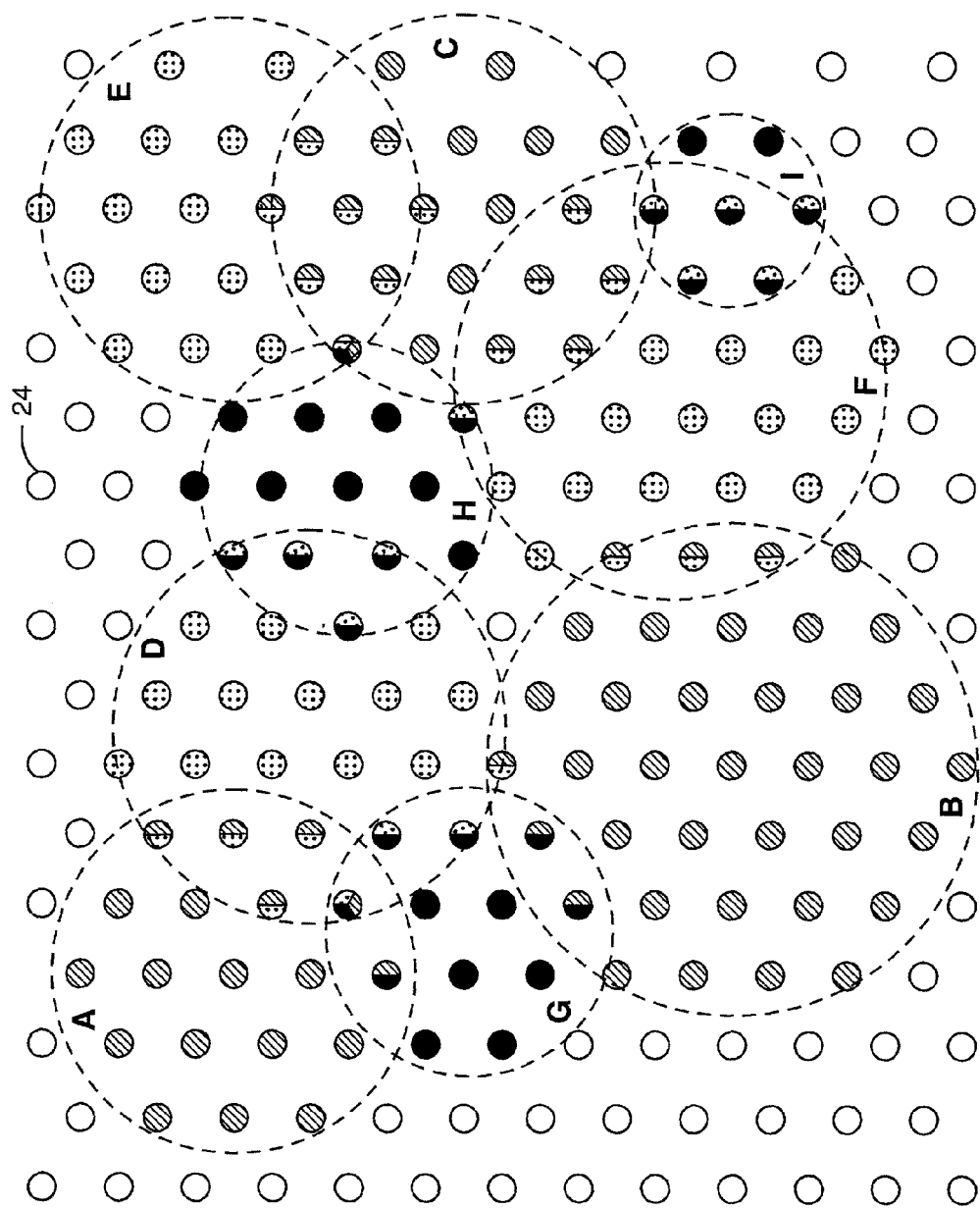
FIG. 7 is a diagram illustrating a network of microstations showing activation patterns for nine mobile terminals in three co-channel groups.

FIG. 7 illustrates the active sets for nine mobile terminals in three different co-channel groups indicated by different shading patterns. The active sets for the nine mobile terminals are labeled A–I, respectively. The circles with a single fill pattern represent microstations 24 transmitting on a single channel, circles containing two fill patterns represent microstations transmitting simultaneously on two different channel, and circles containing three fill patterns represent microstations 24 transmitting simultaneously on three different channels.

As shown in FIG. 7, each microstation 24 may be called on to transmit simultaneously on multiple channels, and could be called on to transmit on the maximum number of available channels. For this reason, each microstation 24 preferably comprises a multi-channel transmitter, such as can be made using linear transmit power amplifiers. Linear power amplifiers are generally of low efficiency or produce unwanted intermodulation. However, the relatively low power transmitters required in the present invention (typically in the order of 20 Milli watts per channel) pose much less challenge as the efficiency is less important at the lower power level. Moreover, all channels in the microcellular system 20 may be transmitted at an equal power level, unlike the centrally-located base station 14 in macro-cellular systems 10, which adjust transmitted power level dependent on the range to the mobile terminal. The resulting disparity in power levels can result in intermodulation between two high power channels swamping a low power channel. Since such power disparity is unnecessary in the microcellular system 20 according to the present invention, the intermodulation at the output of any one microstation 24 is, at worst, 10 dB lower than the power on any channel, and the intermodulation to wanted signal power ratio at the mobile terminal, being the composite of many microstation output signals, is likely to be somewhat lower. The −10 dB intermodulation level is achieved with a saturated amplifier, thus no extreme linearity is required of the microstation 24, even for multi-carrier operations.

Figure 8:
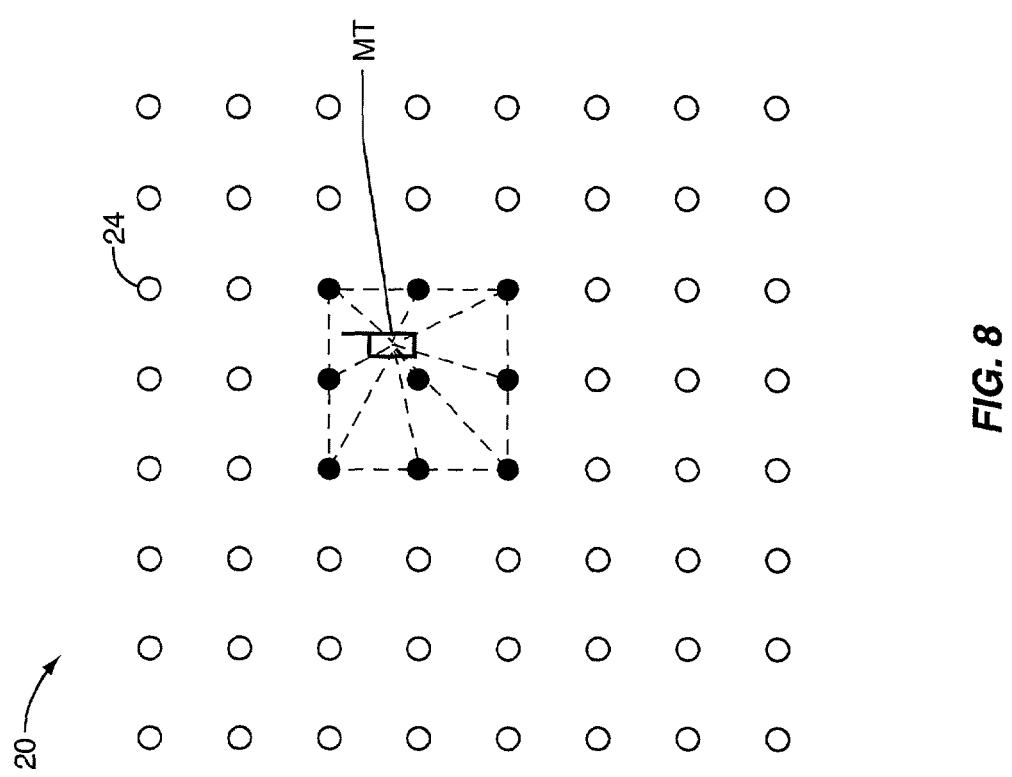
FIG. 8 is a diagram of a network of microstations showing the active microstations for a single mobile terminal.

FIG. 8 illustrates a square grid of microstations 24 according to one embodiment of the present invention. The microstations 24 are represented as circles, with the circles containing black fill representing an active set. In the following discussion, it is assumed that the active set comprises a group of nine microstations 24 surrounding the current location of the mobile terminal. The active sets that use the same channel are separated by at least one grid division so that no microstation 24 is required to transmit two different signals on the same channel at the same time, which could result in a transmission conflict at the microstation 24. The C/I contours for the mobile terminal located within its active set are plotted in FIG. 9. It is assumed that all other microstations 24 outside the active set are transmitting equal power interfering signals intended for other mobile terminals.

Figure 9:
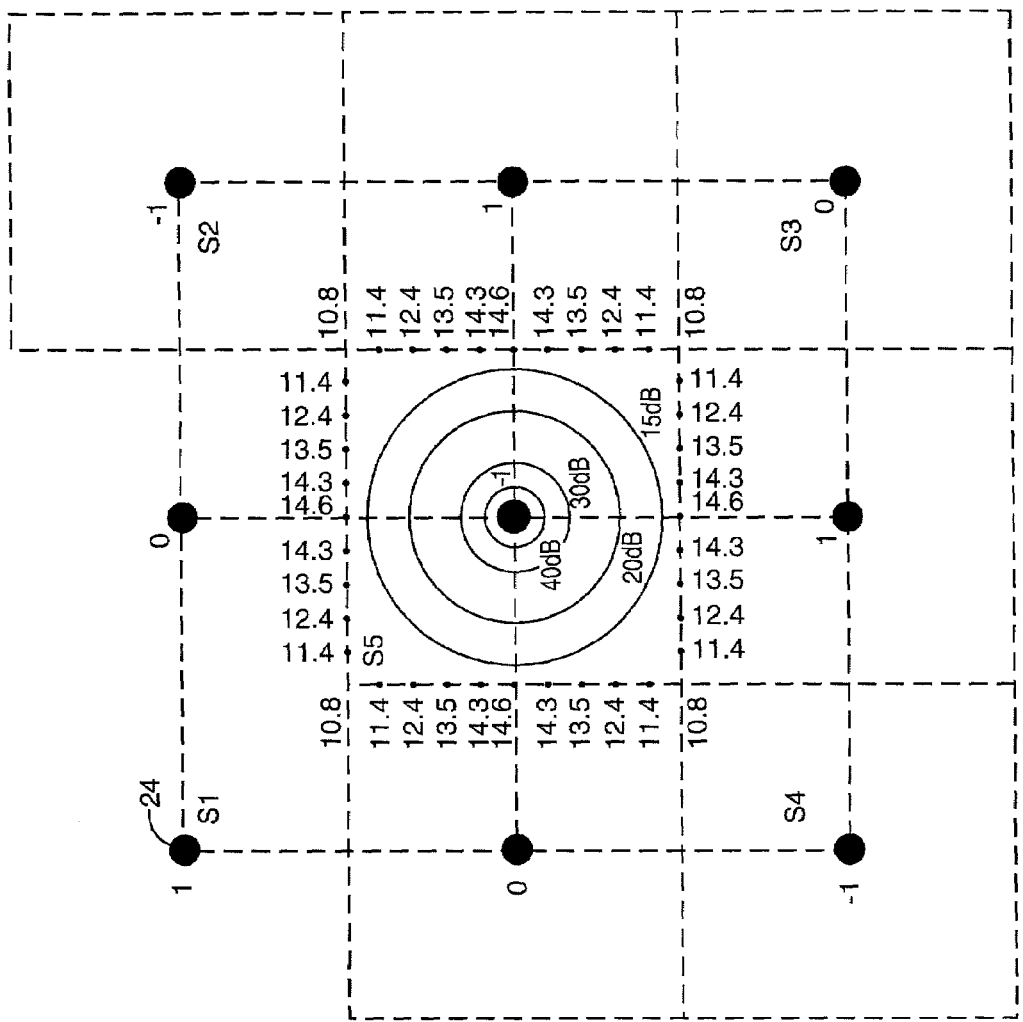
FIG. 9 is a diagram illustrating the carrier-to-interference ratio for the area served by the active microstations in FIG. 8.

The nine microstations 24 in an active set define four squares, denoted S1–S4, with the microstations 24 located at the corners of these four squares S1–S4. The centers of these four squares define a central square which is designated by S5. It is assumed that the mobile terminal lies within the central square S5. If the mobile terminal moves outside the central square S5, the active set would be changed to centralize the pattern around the current location of the mobile terminal so that it is once again within the central square S5. Accordingly, FIG. 9 shows the C/I contours plotted within the central square. The constant C/I contours are roughly circular. The lowest C/I ratio of 10.8 dB occurs at the corners of the central square S5. This C/I ratio is more than sufficient to operate a GSM system using GMSK modulation over the entire field. Alternatively, within the area of the 20 dB C/I contour, which is half the area, a higher order modulation, such as 8-PSK may be used. Moreover, the macrodiversity resulting from the use of nine transmitters to transmit to a single mobile terminal reduces fading and shadowing effects, thereby improving signal quality and reliability.

The diversity gain can be enhanced by delaying or retarding the signal transmitted from selected microstations 24 within the active set. In FIG. 9, the numbers 0, −1, and 1 associated with the nine microstations 24 indicate the relative timing of the signals transmitted by the microstations 24 in the active set. A "−1" represents a delay of 1 symbol period, a "+1" represents a timing advance of one symbol period, and a "0" represents no time delay or advance. When a relative time offset is used at selected microstations 24, the signal received at the mobile terminal appears to have propagated through a multipath channel with two symbol periods of time dispersion, and such a signal may be advantageously decoded using a Viterbi decoder. Other patterns of timing advance/retard can be used that preferably result in a mobile terminal located in the most disadvantaged position from a C/I ratio perspective receiving signals from transmitters having different modulation time and advance retard values. This method provides improved macrodiversity gain compared to synchronous modulation.

According to FIGS. 8 and 9, each channel may be reused every nine square kilometers, assuming a one kilometer microstation 24 spacing. Using a conventional ten kilometer radius cell having three sectors and a three-site, three sector frequency reuse plan, each channel frequency is usable only once in three sites, each of which covers 260 square kilometers. Thus, each channel frequency is used once in every 780 square kilometers. Thus, the present invention has the potential of increasing system capacity by 87 times (780÷9). This capacity increase is obtained by replacing one large antenna site covering 260 square kilometers with 260 microstations 24. Thus, if the cost of a microstation is $87/260 \sim 1/3$ of the cost of a macrostation, the cost per unit capacity is at break-even. In fact, the cost of the microstations 24 is likely to be very much less than one-third the cost of the base station 14 in a macro-cellular system 10, due in part to the lack of a need for a large tower and complex high gain, sectorized antennas. Therefore, there is the potential for significant cost savings per unit of capacity. The capacity calculations described above assume a uniform distribution of static terminals. In practice, the realizable capacity gains will be slightly less than the theoretical gains discussed above.

As the mobile terminal moves through the network, the active set changes to form a virtual cell that follows the mobile terminal through the network. It is to be expected, therefore, that the active sets for mobile terminals operating on the same channel may collide or overlap. That situation may present a problem for a microstation 24 in the active sets for two different co-channel mobile terminals. More particularly, the microstation 24 may be asked to transmit data for two different mobile terminals on the same channel. One method to handle such transmission conflicts involving co-channel mobile terminals is to inhibit conflicting transmissions from any microstations 24 in the active sets. A transmission conflict may be detected by detecting when the same microstation 24 is called upon to transmit two different data streams at the same time using the same communication channel. Only transmission on the contentious channel need be inhibited. For purposes of this application, the term "co-channel mobile terminals" refers to two or more mobile terminals using the same channel frequency at the same time. When a transmission conflict is detected, the microstation 24 serving the co-channel mobile terminals may inhibit transmission to any of the co-channel mobile terminals on the assumption that any transmission would constitute interference to one or another mobile terminal or both. Alternatively, the microstation 24 could transmit data to one co-channel mobile terminal while inhibiting transmission to all other co-channel mobile terminals, for example transmitting to the mobile terminal that was received the strongest. In theory, full overlap of active sets could occur with a significant probability resulting in a loss of signal for one or both interfering mobile terminals. This situation could last for several seconds.

To avoid complete signal loss, the network could attempt to hand-off one of the mobile terminals to a different channel that is not in use in the relevant area responsive to detection of a transmission conflict. Hand-offs, however, involve delay in formulating and transmitting signaling messages to the mobile terminals. An alternative is to use random frequency hopping to minimize the duration of transmission conflicts between interfering mobile terminals. When frequency hopping is employed, the chances of two interfering mobile terminals remaining on the same frequency for consecutive hops is small. Thus, a transmission conflict between two interfering mobile terminals using the same channel in the same location at the same time will likely last only for the duration of one frequency hop. Even if a frequency hopping scheme is employed, transmission conflicts will still occur, but short, random interference events can be bridged using interleaving and error-correction coding, as is well known.

Figure 10:
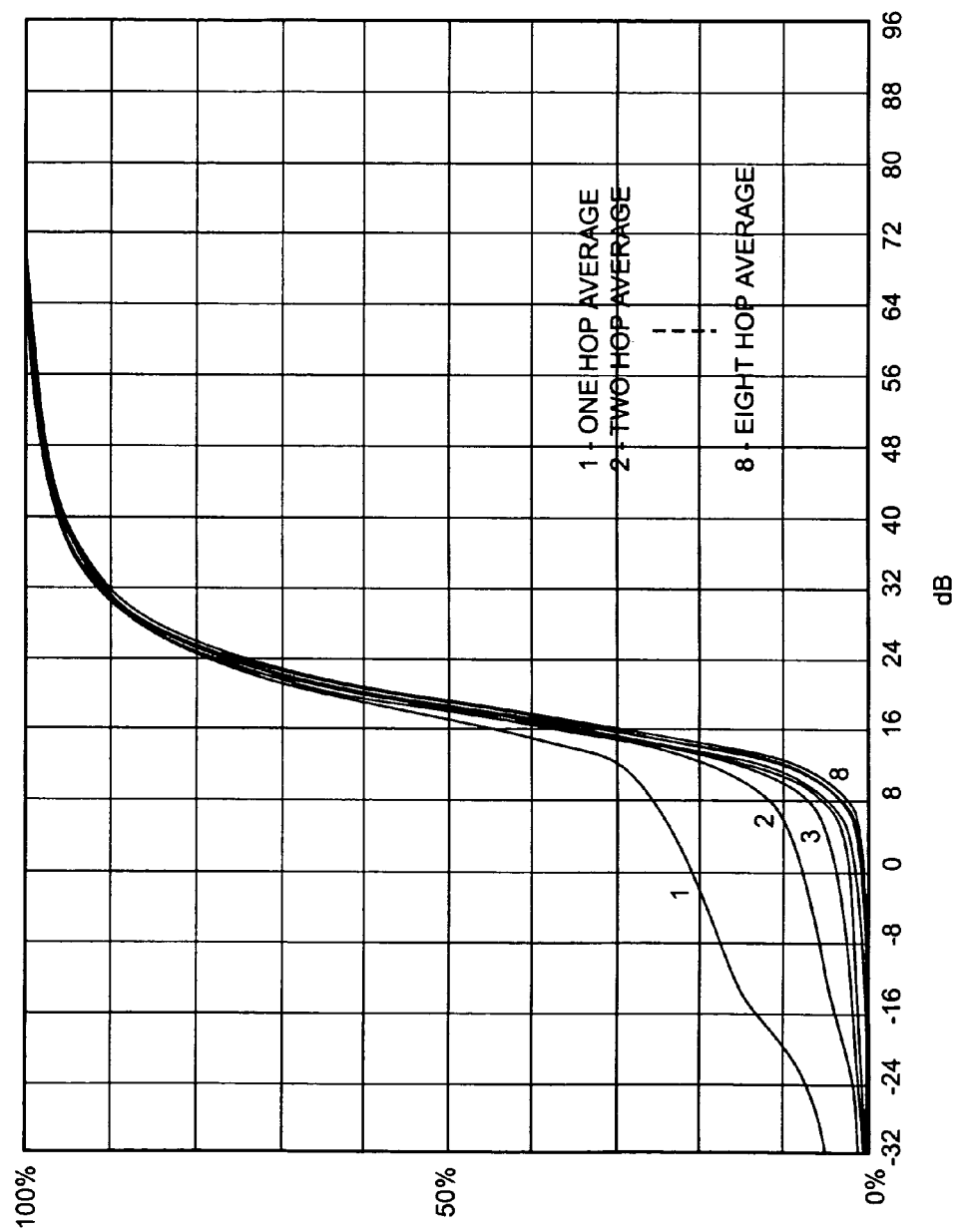
FIGS. 10 and 11 are graphs of the carrier-to-interference ratio for two different conflict-avoidance methods according to the present invention.
Figure 11:
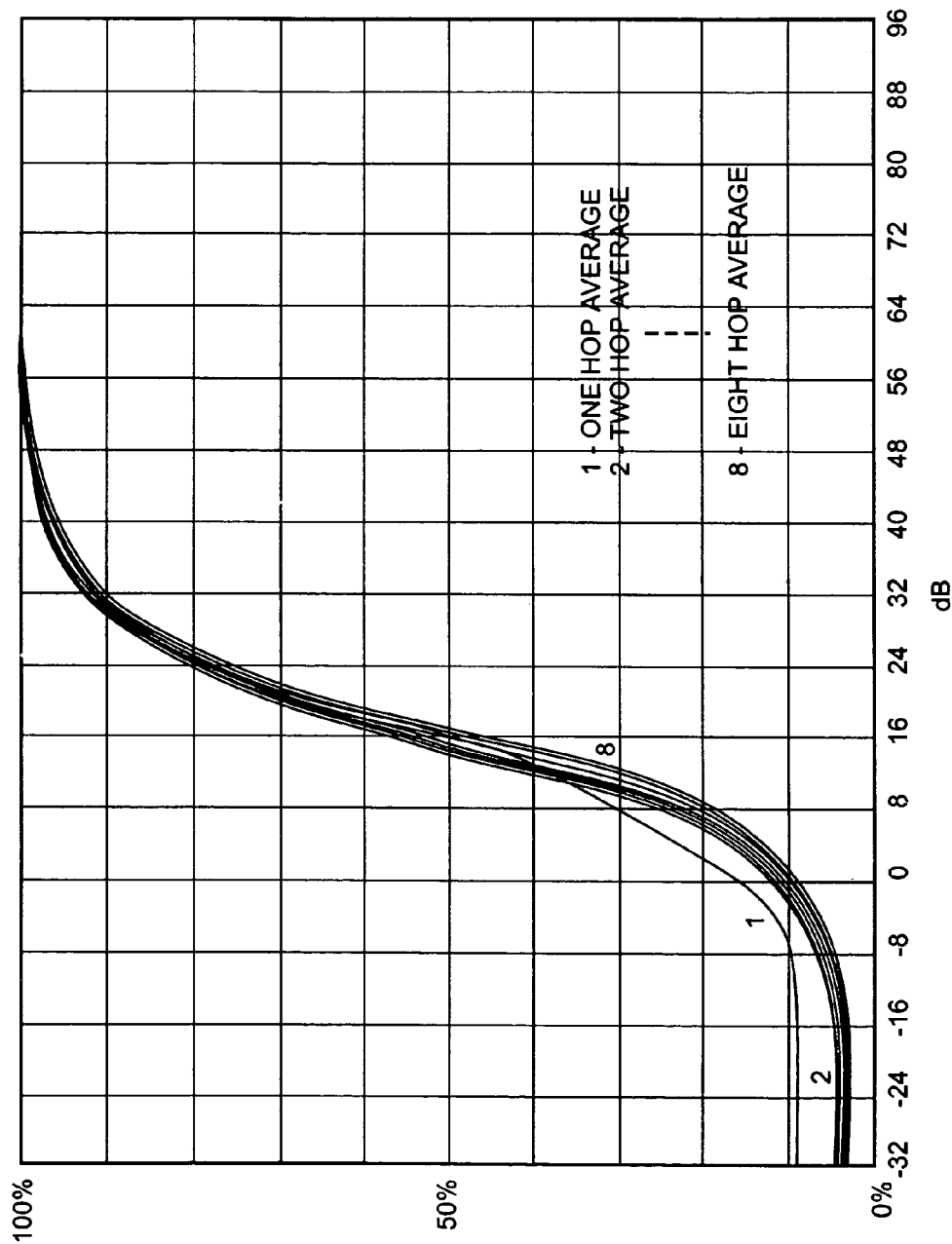

The expected C/I statistics for two transmission conflict handling schemes are shown in FIGS. 10 and 11, respectively. In each of these figures, it is assumed that frequency hopping is used to provide interference averaging. In the microcellular system 20 represented by FIG. 10, the microstations 24 are programmed to inhibit transmission on a communication channel used by two co-channel mobile terminals when a transmission conflict is detected. FIG. 10 shows the cumulative C/I statistics for this technique. In the microcellular system 20 represented by FIG. 11, each microstation 24 transmits the data for a selected mobile terminal when it detects a transmission conflict involving two or more mobile terminals on the same communication channel at the same time. In this case, the microstation 24 transmits the data for the co-channel mobile terminal providing the strongest signal on the uplink communication channel. FIG. 11 shows the cumulative C/I statistics for this technique.

Yet another potential algorithm is for every microstation to transmit on every channel all the time, selecting the modulation to be that for the mobile terminal received the best recently.

The presumption behind the first method is that transmitting anything on the communication channel will do more harm than good, while the presumption behind the second technique is that transmitting the signal for one mobile terminal will do more good than harm. The different curves in each of the figures are for C/I averaged over one to eight hops, respectively. In GSM frequency hopping systems, voice signals are error correction coded by adding redundant bits and then the coded voice bits are interleaved over eight hops. Thus, the bit or frame error performance is related to the C/I averaged over more than one hop. The objective is to achieve a C/I ratio greater than about 8 dB for 98% of mobile terminals, or for 98% of the time. Thus, the important feature of FIGS. 10 and 11 to compare are the tails of the cumulative C/I distribution curves that indicate what fraction of mobile terminals have an effective (i.e., average) C/I ratio less than 8 dB. It can be seen that the second algorithm provides lower tails when the average C/I ratio over more than two hops is the important criterion, while the first algorithm is better when the C/I ratio of a single hop is the important criterion. Lower tails imply that a smaller proportion of mobile terminals are temporarily suffering interference greater than the target mean value. Thus, lower tails equate to a higher grade of service.

When using the microcellular system 20 according to the present invention, signals modulated and transmitted synchronously at different microstations 24 may be received with one or more symbol periods of relative delay at the mobile terminal, depending on the relative distances of the mobile terminal to the microstations 24 in the active set. As explained above, this phenomenon is desirable and may be promoted by introducing time delays of plus or minus one symbol period at selected microstations 24, as long as the resultant delay spread at the mobile terminal is within its equalizer capability. When a change is made in the active set for a mobile terminal as it moves through the network, it is desirable that any sudden change of channel delay profile resulting from the dropping and adding of microstations 24 from its active set should be within the capability of the mobile terminal to detect and adapt. Mobile terminals implementing the standard known as Global System for Mobile Communications (GSM) perform correlations between a known symbol period embedded in every transmitted slot of data and the received data over a sliding window in the order of plus or minus five symbols in order to determine the delay profile and the timing center of maximum correlation energy for each slot. Thus, GSM mobile terminals are immune to changes in delay or timing between slots as long as it is not more than plus or minus a few symbol periods.

With larger site spacing, as may occur in a macrodiversity system, the delay or timing step upon switching transmission from one base station 14 to another (in a conventional macro-cellular system 10) may exceed the mobile terminal's correlation window unless measures are taken to prevent excessive step changes. Such measures can, for example, include retarding transmission timing at a closer site relative to a more distant site by an amount needed to compensate for the step change. This amount can be determined by receiving a signal from the mobile terminal on the uplink at both sites and determining relative delay by correlation with a sync word embedded in the received signal. Assume, for example, that transmissions to the mobile terminal switches from a first base station 14 to a second base station 14 at time t. If, at time t, the second base station 14 is receiving signals on the uplink channel five symbol periods before the first base station 14, the second base station 14 may be programmed to transmit with a timing delay of five symbol periods relative to the first base station 14. As the mobile terminal moves away from the second base station 14, the delay can be reduced, i.e., demodulation symbol timing advanced, such that the mobile terminal still receives a signal centered in its correlation window. One advantage of the microcellular system 20 of the present invention is that the reduced site spacing makes such measures unnecessary, at least for the GSM modulation symbol period of just under four ms. For a CDMA system transmitting a few megachips per second, the timing advance/retard measures described above, or equivalent measures, may be necessary.

Figure 12:
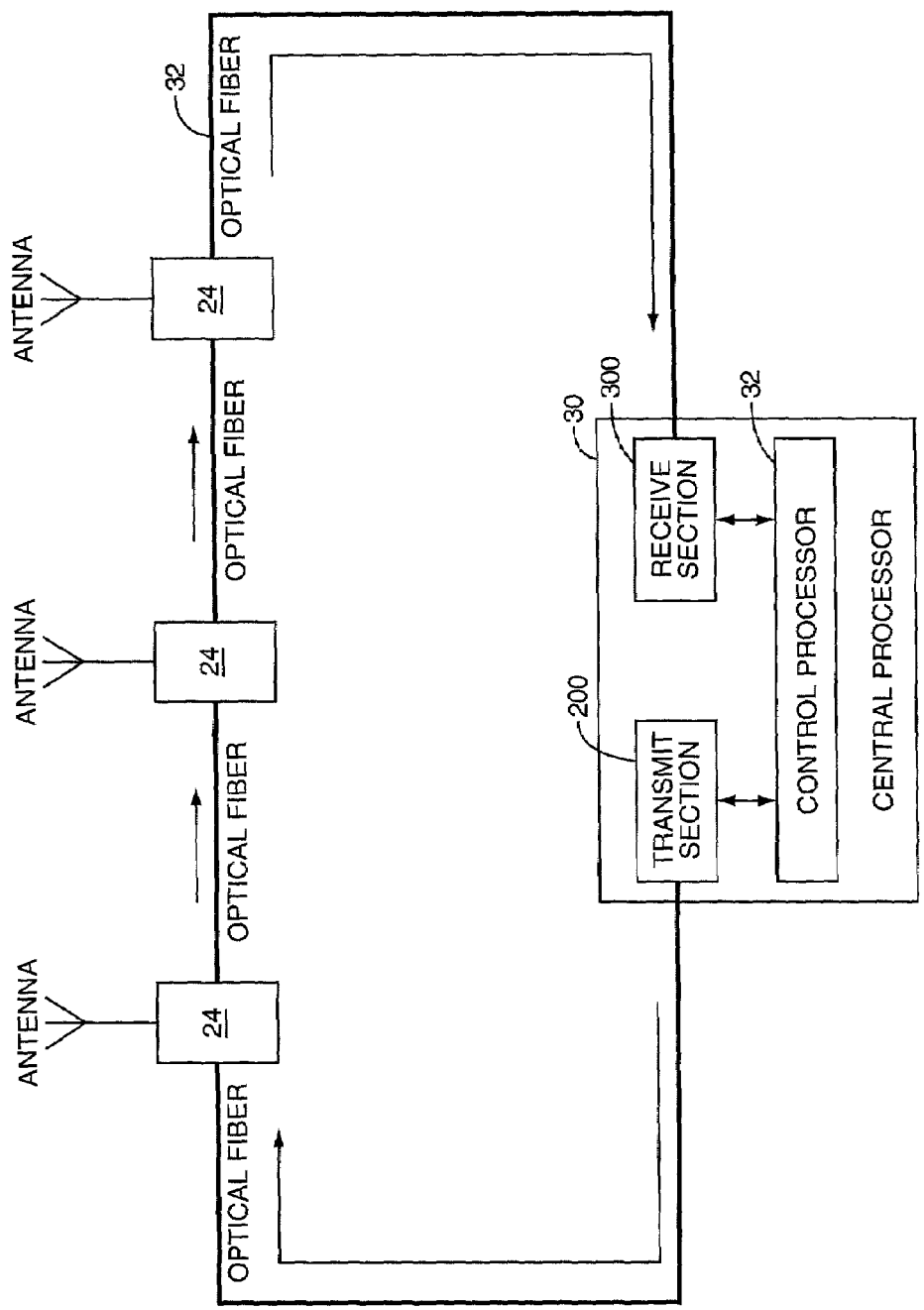
FIG. 12 is diagram illustrating a microstation network according to the present invention.

FIG. 12 illustrates an exemplary system architecture for the microcellular system 20 of the present invention. As shown in FIG. 12, a plurality of microstations 24 located in the same cell 22 are connected to a central processor 30 via communication medium 32 to form a loop. The communication medium 32 may, for example, comprise an optical fiber, a T1 or E1 line, or other link. In the exemplary embodiment described herein, each cell 22 includes a single central processor 30. Alternatively, the microstations 24 in a single cell 22 could be divided into subgroups, with each subgroup having a central processor 30. The central processor 30 comprises a transmit section 200 to generate transmit data to be transmitted by microstations 24 to mobile terminals, a receive section 300 to demodulate and decode receive data received by microstations 24, and a control processor 32. The transmit data may be transmitted from the central processor 30 to the microstations 24 using any one of a number of known multiplexing techniques, including time division multiplexing, frequency division multiplexing, code division multiplexing, or wavelength division multiplexing. The transmit data is formatted and transmitted by the central processor 30 to the first microstation 24. The transmit data passes around the loop from one microstation 24 to the next, until it reaches the last microstation 24. Each microstation 24 extracts the transmit signal intended for that microstation 24 and inserts in its place a received signal for transmission back to the central processor 30. Thus, at each microstation 24, transmit data is extracted from and received data is inserted into the cumulative signal that passes from one microstation 24 to the next. The last microstation 24 in the loop transmits the cumulative signal, which now contains only received signals, back to the central processor 30, which can demodulate and decode the received signals.

Figure 13:
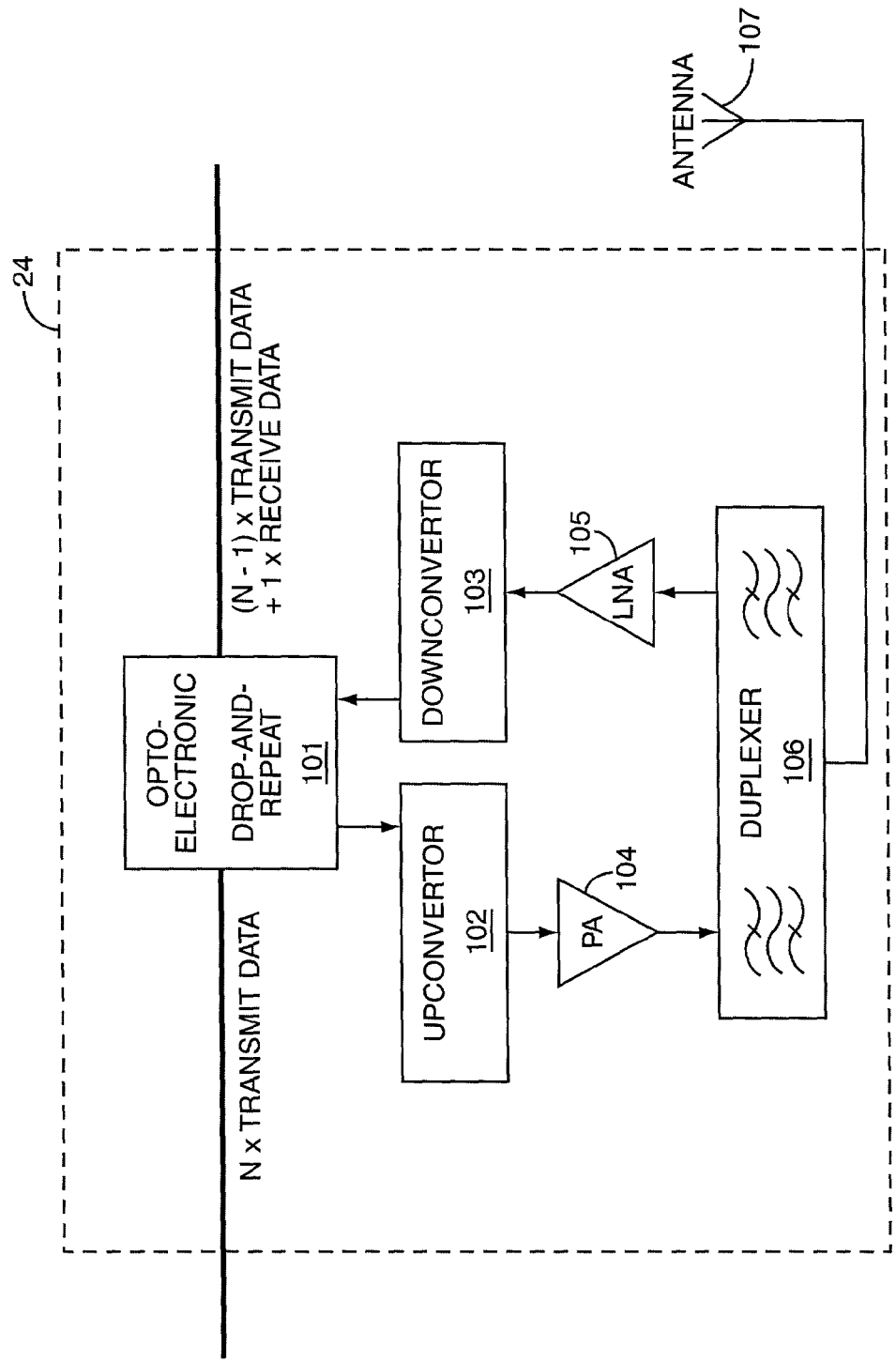
FIG. 13 is a functional block diagram of a microstation in the communication network of the present invention.

FIG. 13 illustrates an exemplary microstation 24. The microstation 24 comprises a drop and insert circuit 101, an upconverter 102, downconverter 103, power amplifier 104, low noise amplifier 105, duplexer 106, and a transmit and receive antenna 107. The drop and insert circuit 101 may, for example, be an opto-electric drop and insert circuit. One practical way to drop and insert optical signals is to first convert the optical signals to electrical signals using photo detectors, to drop and insert the signals in the electrical domain, and then to reconvert the electrical signals to optical signals using laser diodes. Alternatively, direct optical drop and insert devices can be formed using micro-machined, electrically-movable mirrors. The micro-machined mirrors are relatively slow but, nevertheless, fast enough to deflect light to different places for blocks of information bits having sufficiently long duration, such as a timeslot in a GSM or TDMA communication system. Another alternative is to employ dense wavelength division multiplexing, wherein the signal destined for a particular microstation 24 is modulated onto a unique wavelength of light. Using a prism or defraction grating to combine or separate different wavelengths of light, each microstation 24 may then drop off its own particular wavelength of light bearing its intended transmit signal and insert the same wavelength of light remodulated with the corresponding received signal, while light of other wavelengths associated with other microsites is passed through unaffected.

The transmit signal that is extracted or dropped off at each microstation 24 can be a digital baseband representation of a multi-carrier signal comprising in phase (I) and quadrature (Q) components, for example. The digital I/Q sample stream can represent, for example, a sixteen carrier GSM signal of 3.2 MHz bandwidth. Using $65/48$ times over-sampling, each I/Q sample stream is $13/3$ megasamples per second of typically 8+8 bit complex values, providing 69.33 megabits per second per microstation 24. After deformatting and digital-to-analog conversion, the resulting analog I/Q samples are applied to modulator or upconverter 102, which generates a signal in the cellular frequency band. The multi-carrier signal is amplified to the desired transmit power level of, for example, 20 megawatts per carrier by a linear power amplifier 104. The amplified transmit signal is fed to antenna 107 via transmit/receive duplexer 106. The number of bits needed to represent I and Q can be reduced by matching the dynamic range of the quantizing to the linearity of the PA. It has already been pointed out that the latter need not be challengingly high, thus indicating the potential to reduce the I/Q bit rate substantially.

Signals received by antenna 107 are fed via duplexer 106 and low noise amplifier 105 to downconverter 103. The multi-carrier received signal can be converted to digital samples using, for example, the log polar technique described in U.S. Pat. No. RE 37,138, which is incorporated herein by reference. This technique expresses a general complex signal (i.e., the multi-carrier received signal) in terms of an instantaneous phase angle and an instantaneous log amplitude signal, thereby achieving high dynamic range without the use of adaptive gain control (AGC). An 8-bit phase and 8-bit log amplitude representation could be used in this application so that received signal samples replace dropped-off transmit samples exactly.

The dynamic range of received signals for a mobile terminal within the multi-carrier signal may be constrained, if necessary, to allow use of only 8-bit representations by using closed loop power control. Mobile terminals close to a microstation 24 may be commanded to reduce power compared to mobile terminals farther away from the microstation 24. It is an advantage of the high level of receive and transmit diversity provided by the present invention that transmit intermodulation and corresponding receive imperfections are less troublesome due to the interfering signals being different at each microstation 24 and, therefore, not coherently additive. It is even conceivable that a hard-limiting transmitter (i.e., a saturated power amplifier 104) could be used. Use of a saturated power amplifier is also facilitated by the fact that all radiated signals diminish much more rapidly with distance beyond the edge of a virtual cell.

Figure 14:
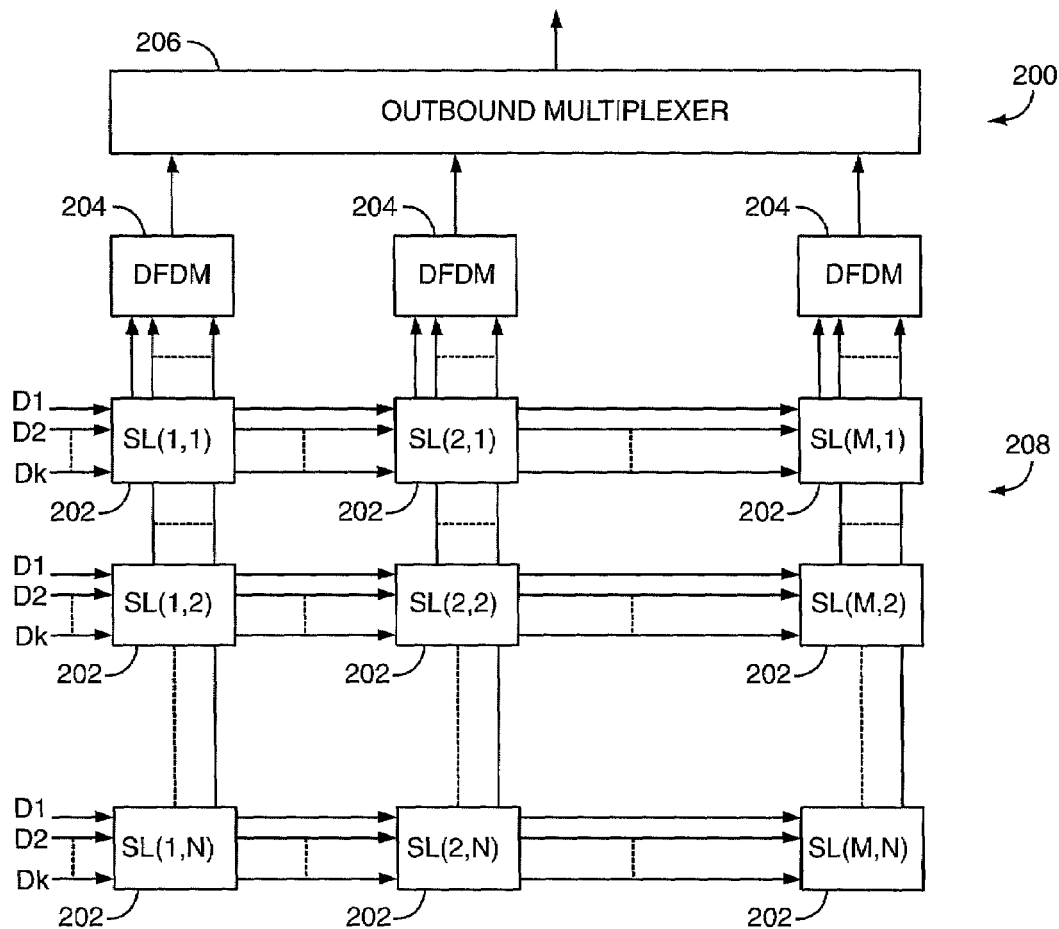
FIG. 14 is a functional block diagram illustrating the transmit section of the central processor.
Figure 15:
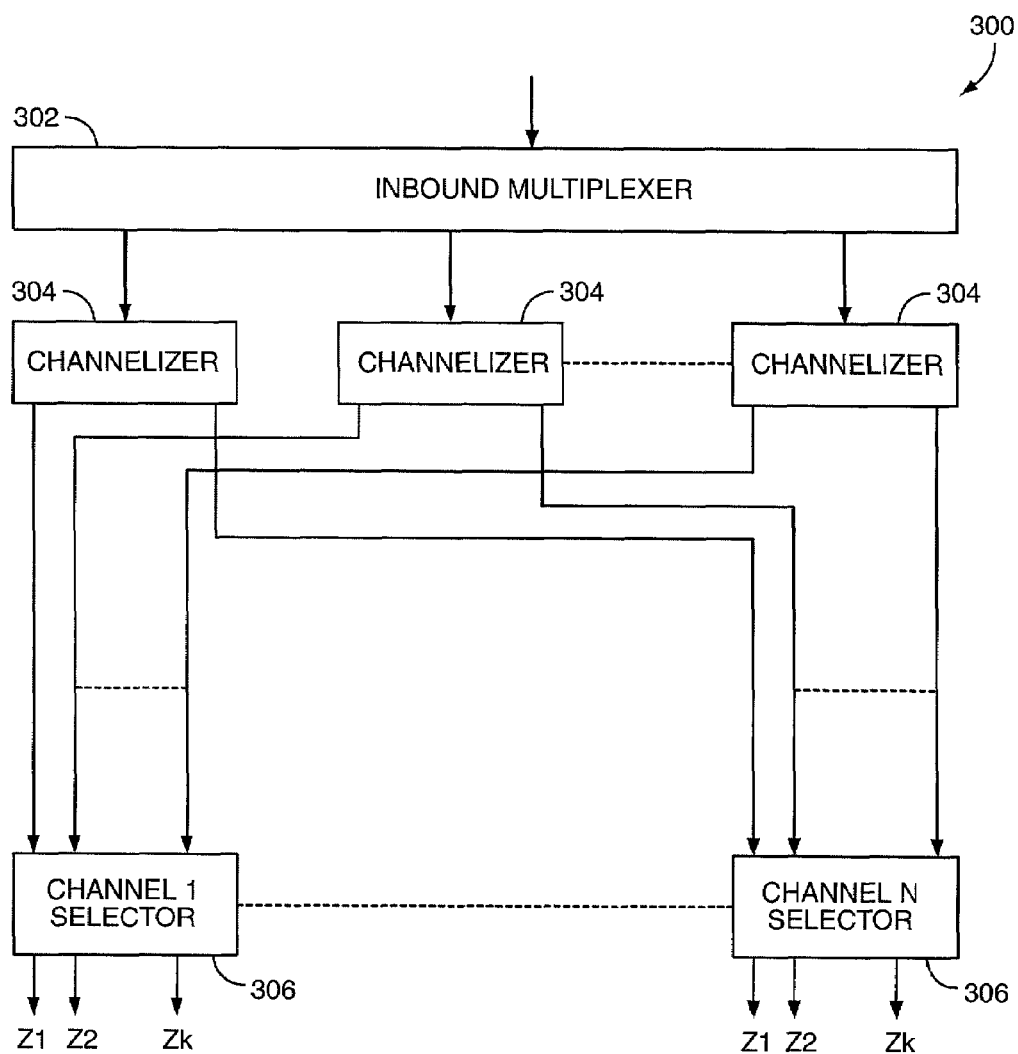
FIG. 15 is a functional block diagram illustrating the received section of the central processor.

FIGS. 14 and 15 illustrate an exemplary embodiment of the central processor 30. FIG. 14 illustrates one realization of the transmit section 200, and FIG. 15 illustrates one realization of the receive section 300 of the central processor 30.

Referring to FIG. 14, the transmit section 200 of the central processor 30 comprises a plurality of selectors 202, one or more digital frequency division multiplexers (DFDMs) 204, and a outbound multiplexer 206. The selectors 204 form an array 208. Each column of the selector array 208 corresponds to a particular microstation 24. Each row corresponds to a particular frequency channel. A number of data streams $D_1, D_2, \ldots D_k$ for transmission enter the first selector 202 in each row and passes along the row to the last selector 202. There may be up to 'k' data streams per frequency channel. Each microstation 24 transmits a single data stream D on each frequency channel. Each selector 202 selects a data stream that is transmitted by a corresponding microstation 24 from the 'k' data streams available for a particular channel. There is one selector 202 for each possible microstation/channel pair. The notation SL(i,j) in FIG. 14 indicates the selector 202 for the jth channel transmitted by the ith microstation 24.

Each data stream can be a binary bit stream, or a pair of binary bitstreams corresponding to a complex modulation in which one bitstream is modulated to the real or 'I' part and the other to the imaginary or 'Q' part. Each data stream could also comprise a stream of complex numbers representing samples of an already modulated and filtered signal, or else a higher-order modulation such as 8-PSK. The data streams may also be tristate or ternary bitstreams representing 1, 0 or −1 signal values, where '1' represents a logical '1'; '−1' represents a logical '0' and '0' means no power shall be transmitted. GSM bursts start and end with guard periods of no transmission which are created by setting the bitstreams to the '0'signal value.

For transmitting signals to the GSM standard, it would be appropriate for each data stream to be a pair of I,Q bitstreams with a half symbol offset so as to generate Offset QPSK, which is the exact form of the modulation used by GSM that is usually approximated to a constant envelope GMSK signal. When there is no need to constrain the signal to be constant envelope, as is the case when using linear transmitters, it is more advantageous to use the exact (OQPSK) form. The symbol rate on the I and Q channel is a multiple of at least one times 13 MHz/96 or approximately 135 kilosamples/sec, for example, 270.833 kilosamples/sec.

Each selector 202 has a control input (not shown) for receiving control signals from control processor 32 indicating which one, if any, of the 'k' data streams shall be selected. The selectors 202 for a given microstation 24 connect to the same DFDM 204. In the disclosed embodiment, there is one DFDM 204 for each microstation 24. The DFDM 204 multiplexes the data streams selected to be transmitted by a given microstation 24. For example, in a GSM system, the DFDM 206 filters and upconverts the data streams to a respective 200 KHz channel in the complex digital baseband. The outputs from all DFDMs 204 may then be further multiplexed by the outbound multiplexer 206 for distribution using fiber or cable to the microstations 24. The outbound multiplexer 206 may, for example, use wavelength division multiplexing when optical fiber is used as a distribution medium. Other forms of multiplexing, such as frequency division multiplexing, time division multiplexing, code division multiplexing and orthogonal frequency division multiplexing, could also be used when appropriate.

The DFDM 204 may operate by combining data streams in pairs by first filtering the data streams to prevent adjacent channel spillover, then rotating the I,Q signals of one or both filtered streams to shift the signals into adjacent channels 200 KHz apart, and then upsampling the signals by a factor of two. The shifted and upsampled signals may then be added to produce a 400 KHz wide signal in the complex baseband at a sampling rate of preferably 65/48 times the bandwidth or 541.666 kilosamples per second for both I and Q sample streams. Two pairs of such 400 KHz signals may then be combined in like fashion, but with a 400 KHz relative shift to give 1083.333 kilosamples per second, and so forth. When the final I,Q sample streams arrive and are dropped off at its intended microstation 24, it is only necessary to D-to-A convert the I,Q sample streams, filter them to produce continuous time signals, then quadrature modulate the continuous time signals onto a radio frequency carrier.

The selectors 204, as previously indicated, are controlled by control processor 32 to select data streams for transmission intended for mobile terminals that are received the strongest at each microstation 24. The selector channel to which a data stream is applied may be varied from burst to burst or frame to frame to effect frequency hopping. For example, the data stream for a given mobile terminal may be connected to input D1 if, for that burst, slot or frame the mobile terminal shall be tuned to channel 1, or alternatively to input D(k+1) if the mobile terminal will be receiving on channel 2. This method of creating frequency hopping transmissions is called "baseband hopping". The same data stream may be selected for transmission by multiple microstations 24, providing transmit diversity.

The selectors 204 may also be controlled by the control processor 32 to delay any selected data stream by one or two symbols in order to provide the +/−1 symbol delay for optimum transmit diversity. This delay can be fixed for a given microstation 24 according to its location.

FIG. 15 shows the receive section 300 of the central processor. The receive section 300 comprises an inbound demultiplexer 302, a digital channelizer 304 for each microstation 24, and a channel selector 306 for each frequency channel. The inbound cable(s) or fiber(s) brings receive samples from each microstation 24 to the central processor 30. The inbound multiplexer 302 separates the receive samples from each microstation 24 and routes the receive samples to a corresponding digital channelizer 304. For a GSM system, for example, the digital channelizers 304 may comprise digital FDM demultiplexers that filter and separate a sample stream for a 200 KHz frequency channel. The sample streams for the same frequency channel from each microstation 24 are input to a corresponding channel selector 306. The channel selector 306 selects the microstations 24 that shall be used to receive the associated channel for decoding each signal.

One implementation may comprise selecting a predetermined number of sample streams from different microstations 24 for each signal k to be decoded. The selected microstations 24 would typically comprise the microstations 24 receiving the signal the strongest or those closest to the current location of the mobile station. As described earlier, nine microstations 24, referred to as the active set for a mobile terminal, may be selected to provide sample streams for decoding signal k from each mobile terminal. The received sample streams from the nine selected microstations 24 are multiplexed by the channel selector 306 to provide a multiplexed I,Q stream $Z_k$ at the output of the channel selector 306. Each channel selector 306 may provide up to n multiplexed I,Q, streams, each one corresponding to a different received signal k. The multiplexed I,Q sample streams $Z_k$ may then be processed by a diversity demodulator to diversity combine the samples.

For each sample stream $Z_1 \ldots Z_n$, there is a corresponding mobile terminal location which may be known to the central processor 30. A multi-user demodulator may optionally be used to decode signals from geographically adjacent mobile terminals to reduce mutual interference. For example, the Spatial Viterbi Algorithm described in U.S. Pat. No. 5,790,606 to Applicant entitled "Joint Demodulation using Spatial Maximum Likelihood" can be used. The '606 patent is hereby incorporated by reference herein. Also, the present invention may employ techniques for jointly demodulating multiple receive signals that have propagated through multipath channels to be received at multiple antennas, as disclosed in U.S. patent application Ser. No. 09/945,002 filed Aug. 31, 2001 titled "Interference Cancellation In a CDMA Receiving System." Using the techniques described in this patent, each channel may be used to simultaneously receive signals from two or more mobile terminals by combining signals received from two or more microstations 24 in a manner that cancels interference from one or more unwanted signals while receiving a wanted signal.

The channel selector 306 could also select a predetermined number of microstations 24, in addition to those in the active set for a mobile terminal, as candidates to replace a current member of the active set. The control processor 32 within the central processor 30 may monitor the received signal strength from the candidate microstations 24 and compare the received signal strength of the candidate microstations 24 to the received signal strength of the microstations 24 in the active set. If the received signal strength of one of the candidate microstations 24 becomes consistently larger than the received signal strength of one of the nine microstations 24 in the active set for a mobile terminal, the candidate station 24 may be added to the active and an existing member of the active set may be dropped.

The control processor 32 may monitor which cluster of nine sites is included in the active set from frame to frame, and with knowledge of their relative locations, choose the candidate stations 24 to be those nearby. For example, the control processor 32 may chose the candidate microstations 24 to be those located nearest the center of gravity of the selected microstations 24 in the active set. The center of gravity may be defined by imagining masses proportional to the received signal strength centered at each microstation 24 location. Alternatively, the geographical center of the cluster of nine microstations 24 can be defined by computing their average position. Yet another alternative is to estimate the position of the mobile terminal by processing the signals received at different microstations 24 and selecting the microstations 24 nearest the mobile terminal but not currently in the active set as the candidate microstations 24.

Control processor 32 makes the decision which microstations 24 to use for receiving and transmitting for each mobile terminal. The control processor 32 receives the signal strength measurements from each microstation 24, which indicate the total energy received at each microstation 24 from designated mobile terminals. Since signal strength varies with fading, which is frequency selective, the control processor 32 may average the received signal strength over a number of frames/frequency hops, such as the GSM protocol's voice interleaving depth of eight frames. The control processor 32 then makes a decision on which microstations 24 to use for receiving and transmitting.

Figure 16:
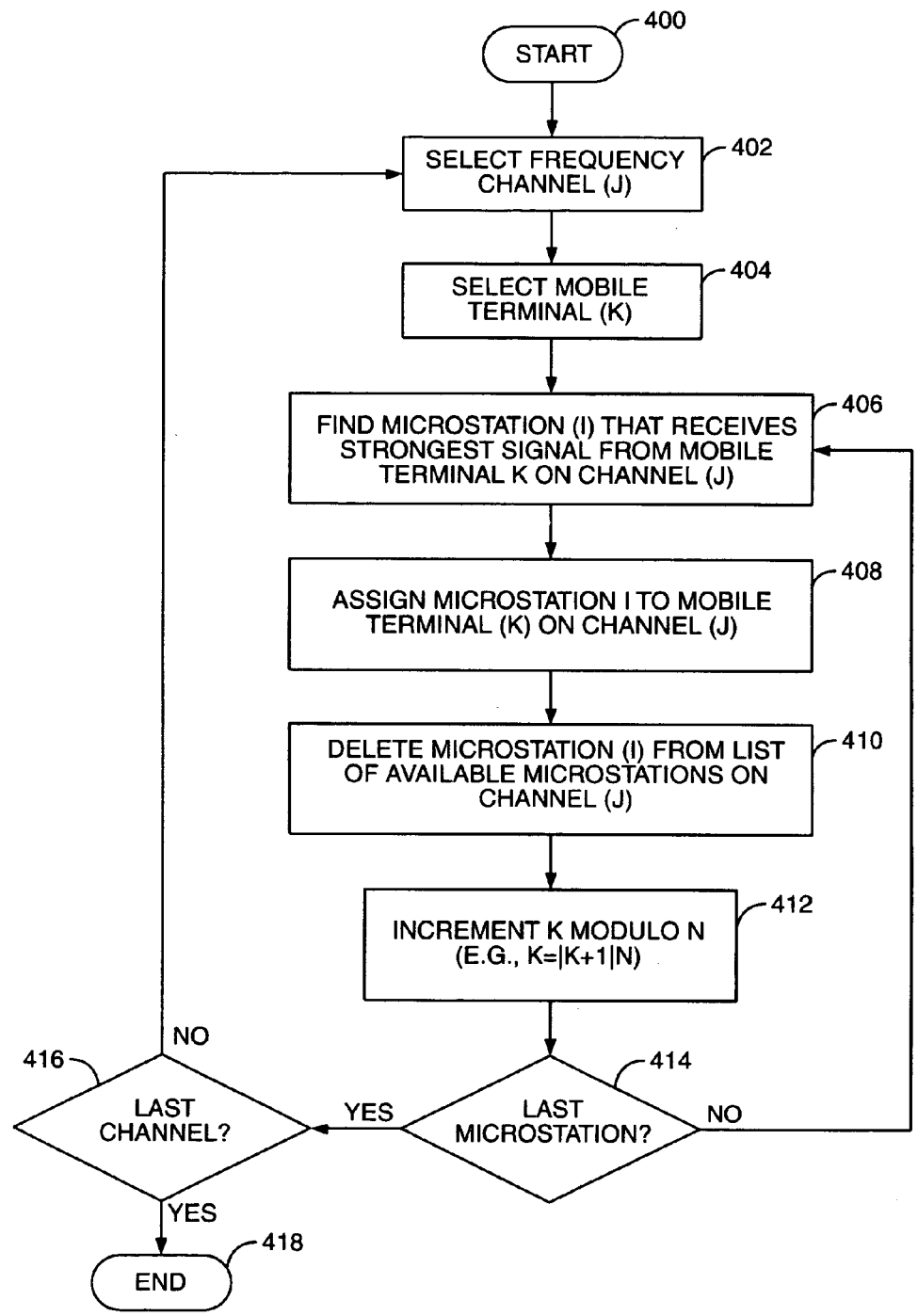
FIG. 16 is a flow chart illustrating an exemplary procedure for assigning microstations to mobile terminals.

Several methods of selecting microstations 24 to include in the active set for a mobile terminal 24 have already been described. FIG. 16 illustrates an exemplary procedure for assigning microstations 24 to receive and transmit for all active mobile terminals. The procedure shown in FIG. 16 ensures that all mobile terminals are served by at least one microstation 24, and thus prevents one mobile terminal from "hogging" communication resources by virtue of being a particularly strong transmitter. The procedure is invoked at block 400. At block 402, the control processor 32 selects a frequency channel j and then selects a mobile terminal k at block 404. The control processor 32 determines which microstation 24 receives the strongest signal from selected mobile terminal k (block 406), and then assigns that microstation 24 to receive from and transmit to mobile terminal k (block 408). The selected microstation 24 is then deleted from the list of available microstations (block 410) for the channel under consideration. At block 412, the control processor 32 selects another mobile terminal k by incrementing i modulo the number n of mobile terminals. At block 414, the control processor 32 determines whether any microstations 24 remain to be assigned for the frequency channel under consideration. If so, processing returns to block 406. When all microstations 24 for a given frequency channel have been selected, the control processor 32 determines whether there are any additional frequency channels to consider (block 416). Is so, processing returns to block 402. this process repeats until all frequency channels have been processed and the procedure ends at block 418.

The procedure shown in FIG. 16 is "fair" to mobile terminals by assigning at least one microstation 24 to transmit to each first, then continuing to assign a second, diversity microstation 24 to each, and so forth. A further refinement is to first arrange that the received signals from different mobile terminals have been sorted in descending order of total received signal strength with increasing index I. This ensures that microstations 24 get allocated to the mobile terminals to which they are closest as a first priority.

The present invention relates primarily to the downlink transmissions. Improvements in uplink transmissions are described in, for example, U.S. Pat. Nos. 5,619,503; 5,790,606; and 6,148,041, which are incorporated herein by reference. The techniques described in these patents may be applied to processing uplink transmissions while using the present invention for downlink transmissions. The difference between uplink and downlink transmissions is that the network has access to all of the signals received at all of the microstations 24 and decodes all mobile terminal transmissions. In the downlink direction, however, a mobile terminal only has access to its own received signal and only decodes one signal. The central processor 30 is therefore much more able to carry out sophisticated joint demodulation or interference suppression techniques to decode each mobile terminal signal in the presence of others, even on the same frequency. One approach disclosed in the above-incorporated patents is to decode the strongest signals first by any suitable means, and then to subtract those that have been successfully decoded so as to be able to decode weaker signals now absent interference from the stronger co-channel signals.

What is claimed is:

1. A method of providing wireless communications between a plurality of fixed microstations and a plurality of mobile terminals, said method comprising:
   for each mobile terminal, selecting a set of surrounding microstations to transmit information to the mobile terminal;
   detecting a transmission conflict involving two or more co-channel mobile terminals being served by the same microstation;
   inhibiting transmissions from the microstation serving the co-channel mobile terminals to at least one of the co-channel mobile terminals in response to a transmission conflict; and
   for each mobile terminal, reselecting the set of surrounding microstations to transmit information to the mobile terminal in response to a change in position of the mobile terminal.

2. The method of claim 1 wherein selecting a set of surrounding microstations to transmit information to the mobile terminal comprises:
   receiving a signal transmitted from the mobile terminal at a plurality of microstations;
   measuring the strength of the signal from the mobile terminal received at each one of the plurality of microstations; and
   selecting one or more microstations based on the strength of the signals received at the plurality of microstations.

3. The method of claim 2 wherein selecting one or more microstations based on the strength of the signals received at each microstation comprises selecting microstations where the strength of the received signals from the mobile terminal meet a predetermined threshold criteria.

4. The method of claim 3 wherein the selected microstations do not exceed a predetermined number.

5. The method of claim 2 wherein selecting one or more microstations based on the strength of the signals received at each microstation comprises selecting a predetermined number of microstations which receive the strongest signal from the mobile terminal.

6. The method of claim 1 wherein inhibiting transmission from the microstation to at least one of the co-channel mobile terminals comprises:
   selecting a co-channel mobile terminal to serve based on signal strength measurements of signals received at the microstation from the co-channel mobile terminals;
   transmitting a signal for the selected co-channel mobile terminal; and
   inhibiting transmissions to the non-selected co-channel mobile terminals.

7. The method of claim 1 wherein inhibiting transmission from the microstation to at least one of the co-channel mobile terminals comprises inhibiting transmission from the microstation to all of the co-channel mobile terminals.

8. The method of claim 1 wherein the communication system employs time division multiplexing and wherein each mobile terminal is assigned to a TDMA time slot.

9. The method of claim 1 wherein the communication system employs frequency hopping for downlink transmissions and wherein each mobile terminal is assigned a hop channel.

10. The method of claim 1 wherein the communication system employs code division multiplexing and wherein each mobile terminal is assigned a code channel.

11. A communication system comprising:
    a plurality of microstations, each including a transmitter for transmitting signals to mobile terminals;
    a central processor connected to the plurality of microstations for selecting a group of microstations to transmit signals to each mobile terminal thereby forming virtual cells in the vicinity of each mobile terminal;
    a detection circuit located at said central processor for detecting a transmission conflict involving two or more co-channel mobile terminals being served by the same microstation; and
    wherein said central processor is operative to inhibit transmissions from the microstation serving the co-channel mobile terminals to at least one of the co-channel mobile terminals in response to detection of the transmission conflict.

12. The communication system of claim 11 wherein each microstation further comprises a receiver to receive signals from the mobile terminals.

13. The communication system of claim 12 wherein the central processor selects a group of microstations to transmit signals to a given mobile terminal based on the strength of the signals received at each microstation from the given mobile terminal.

14. The communication system of claim 13 wherein the central processor selects a group of microstations to transmit signals to a given mobile terminal that receive signals from the given mobile terminal with a signal strength above a predetermined threshold.

15. The communication system of claim 14 wherein the selected microstations in the group do not exceed a predetermined number.

16. The communication system of claim 13 wherein the central processor selects a predetermined number of microstations to transmit signals to a given mobile terminal that receive signals from the given mobile terminal the strongest.

17. The communication system of claim 11 wherein the central processor transmits data for one co-channel mobile terminal and inhibits transmission to all other co-channel mobile terminals in response to the transmission conflict.

18. The communication system of claim 17 wherein the central processor transmits data to the mobile terminal from which the microstation receives signals the strongest.

19. The communication system of claim 13 wherein the central processor inhibits transmission to all co-channel mobile terminals in response to the transmission conflict.

20. The communication system of claim 11 wherein the central processor generates transmit signals to be transmitted to the mobile terminals by the plurality of microstations, and wherein the transmit signals for a given mobile terminal are forwarded from the central processor to selected microstations in the active set for the given mobile terminal.

21. The communication system of claim 20 wherein the transmit signals generated at the central processor comprises a plurality of complex signal samples.

22. The communication system of claim 21 wherein the complex signal samples are I,Q signal samples comprising an in-phase component and a quadrature component.

23. In a communication system comprising a plurality of cells with each cell having a network of microstations, a method of communicating with a mobile terminal comprising:
selecting a group of microstations in the vicinity of a mobile terminal to transmit information to the mobile terminal on a downlink channel assigned to the mobile terminal, said group of microstations comprising an active set for the mobile terminal that defines a virtual cell; and
dropping microstations from and adding microstations to the active set for the mobile terminal responsive to the movement of the mobile terminal so that the virtual cell follows the mobile terminal as the mobile terminal moves through the network of microstations.

24. The method of claim 23 further comprising transmitting information to the mobile terminal from first and second microstations in the active set for the mobile terminal, wherein the transmission to the mobile terminal from the first microstation is delayed or advance with respect to the transmission of the same information from the second microstation.

25. The method of claim 23 further comprising generating transmit signals for transmission to a given mobile terminal at a central processor and forwarding the transmit signal from the central processor to selected microstations in the active set for the given mobile terminal.

26. The method of claim 25 wherein the transmit signal comprises a plurality of complex signal samples.

27. The method of claim 26 wherein the complex signal samples are I,Q signal samples comprising an in-phase component and a quadrature component.

28. The method of claim 23 further comprising transmitting the same information to the mobile terminal from each of the microstations in the active set for the mobile terminal.

29. The method of claim 28 wherein transmitting the same information to the mobile terminal from each of the microstations in the active set for the mobile terminal comprises transmitting the information from first and second microstations in the active set with a relative phase difference.

30. A communication system comprising:
a network comprising a plurality of microstations within a cell in a cellular communication network;
a central controller connected to the network of microstations to select a group of microstations to transmit information to a given mobile terminal within the cell on a downlink channel assigned to the given mobile terminal, said group of microstations comprising an active set for the mobile terminal that defines a virtual cell; and
said central controller operative to add and drop selected microstations from the active set for the mobile terminal responsive to the movement of the mobile terminal so that the virtual cell follows the mobile terminal as the mobile terminal moves through the network of microstations.

31. The communication system of claim 30 wherein the central controller comprises a central processor to generate transmit signals to be transmitted to the mobile terminal by the microstations in the active set for the mobile terminal, and wherein the central controller forwards the transmit signal for the mobile terminal to the microstations in the active set for the mobile terminal.

32. The communication system of claim of claim 31 wherein the transmit signal comprises a plurality of complex signal samples.

33. The communication system of claim 32 wherein the complex signal samples are I,Q signal samples comprising an in-phase component and a quadrature component.

34. The communication system of claim 30 wherein first and second microstations in the active set for the mobile terminal transmit the same information to the mobile terminal with a relative phase difference.

35. A central controller connected to a plurality of microstations in a communication system, the central controller comprising:
a transmit section to generate transmit data; and
a control processor configured to:
select an active set of microstations to transmit the generated transmit data to a mobile terminal over a downlink channel assigned to the mobile terminal, the active set defining a virtual cell for the mobile terminal; and
alter the active set of the mobile terminal responsive to the movement of the mobile terminal so that the virtual cell follows the movement of mobile terminal.

36. The central controller of claim 35 wherein the central processor is configured to alter the active set by adding and dropping selected microstations from the active set based on the strength of the signals received at the microstations from the mobile terminal.

37. The central controller of claim 36 wherein the central processor adds and drops the selected microstations based on whether the strength of the signals received at the microstations is above a predetermined threshold.

38. The central controller of claim 35 wherein the control processor is configured to forward the generated transmit data to the microstations in the active set for transmission to the mobile terminal.

39. The central controller of claim 38 wherein the control processor is configured to forward the generated transmit data to first and second microstations in the active set such that the first and second microstations transmit the same generated transmit data to the mobile terminal with a relative phase difference.

40. The central controller of claim 35 wherein the control processor is configured to select the active set such that the number of microstations in the active set does not exceed a predetermined number.

41. The central controller of claim 35 further comprising a receive section to receive signals forwarded by the microstation.

42. A central controller connected to a plurality of microstations in a communication system, the central controller comprising:
 a transmit section to generate transmit data; and
 a central processor configured to:
  select a set of a set of surrounding microstations to transmit information to a mobile terminal;
  detect a transmission conflict involving two or more co-channel mobile terminals being served by the same microstation;
  inhibit transmissions from the microstation serving the co-channel mobile terminals to at least one of the co-channel mobile terminals responsive to detecting the transmission conflict; and
  reselect the set of surrounding microstations to transmit information to the mobile terminal responsive to a change in position of the mobile terminal.

43. The central controller of claim 42 wherein the central processor is configured to inhibit the transmissions from the microstation to all of the co-channel mobile terminals.

44. The central controller of claim 42 wherein the central processor inhibits the transmissions from the microstation by:
 selecting a co-channel mobile terminal to serve based on signal strength measurements of signals received at the microstation from the co-channel mobile terminals;
 transmitting a signal for the selected co-channel mobile terminal; and
 inhibiting transmissions to the non-selected co-channel mobile terminals.

45. A microstation in a wireless communication system comprising:
 an antenna to receive a first multi-carrier signal from one or more mobile terminals;
 a downconverter to generate a first composite complex baseband signal from the first multi-carrier signal;
 an interface circuit to send the first composite complex baseband signal to a remotely located central controller, and to receive a second composite complex baseband signal transmitted from the remotely located central controller;
 an upconverter to generate a second multi-carrier signal from the second composite complex baseband signal; and
 the antenna being configured to transmit the second multi-carrier signal to the one or more mobile terminals.

46. The microstation of claim 45 wherein the downconverter downconverts the first multi-carrier signal into digital samples to generate the first composite complex baseband signal.

47. The microstation of claim 45 wherein the upconverter generates the second multi-carrier signal in a cellular frequency band.

48. A method of providing wireless communications between one or more mobile terminals and a central controller, the method comprising:
 receiving a first composite complex baseband signal at a microstation from a remotely located central controller;
 generating a first multi-carrier signal from the first composite complex baseband signal;
 transmitting the first composite complex baseband signal to one or more mobile terminals;
 receiving a second multi-carrier signal from the one or more mobile terminals at the microstation;
 generating a second composite complex baseband signal from the second multi-carrier signal; and
 transmitting the second composite complex baseband signal to the remotely located central controller.

49. The method of claim 48 wherein generating a second composite complex baseband signal from the second multi-carrier signal comprises downconverting the second multi-carrier signal into digital samples.

50. The method of claim 48 wherein generating a first multi-carrier signal from the first composite complex baseband signal comprises upconverting the first multi-carrier signal in a cellular frequency band.

* * * * *